US011222033B2

(12) United States Patent
Tiwari et al.

(10) Patent No.: US 11,222,033 B2
(45) Date of Patent: Jan. 11, 2022

(54) DYNAMIC DATA RETRIEVAL AND ANALYTICAL CHART RENDERING FOR DATA SETS

(71) Applicant: SAP SE, Walldorf (DE)

(72) Inventors: Rahul Tiwari, Allahabad (IN);
Krishnan Raghupathi, Bangalore (IN);
Hari Prasada Reddy, Bangalore (IN)

(73) Assignee: SAP SE, Walldorf (DE)

( * ) Notice: Subject to any disclaimer, the term of this patent is extended or adjusted under 35 U.S.C. 154(b) by 250 days.

(21) Appl. No.: 16/197,937

(22) Filed: Nov. 21, 2018

(65) Prior Publication Data

US 2020/0159849 A1 May 21, 2020

(51) Int. Cl.
*G06F 16/00* (2019.01)
*G06F 16/248* (2019.01)
*G06T 11/20* (2006.01)
*G06F 16/242* (2019.01)
*G06F 16/245* (2019.01)
*G06F 16/28* (2019.01)

(52) U.S. Cl.
CPC .......... *G06F 16/248* (2019.01); *G06F 16/242* (2019.01); *G06F 16/245* (2019.01); *G06F 16/285* (2019.01); *G06T 11/206* (2013.01)

(58) Field of Classification Search
CPC .... G06F 16/242; G06F 16/245; G06F 16/248; G06F 16/285; G06F 16/26; G06T 11/206; H04L 67/12
See application file for complete search history.

(56) References Cited

U.S. PATENT DOCUMENTS

| 5,966,139 | A | 10/1999 | Anupam et al. |
| 8,660,822 | B2 | 2/2014 | Sharma et al. |
| 9,817,653 | B2 | 11/2017 | Sreedharan et al. |
| 10,025,817 | B2 | 7/2018 | Mavinakuli et al. |
| 10,452,651 | B1 * | 10/2019 | Palou ............... G06F 16/245 |
| 2006/0221077 | A1 | 10/2006 | Wright et al. |
| 2011/0196655 | A1 | 8/2011 | Sharma et al. |
| 2012/0229466 | A1 * | 9/2012 | Riche ............ G06F 16/9038 345/440 |

(Continued)

OTHER PUBLICATIONS

Agarwal et al., "Blink and It's Done: Interactive Queries on Very Large Data," Proc. of the VLDB Endowment, vol. 5, 4 pp. (Aug. 2012).

(Continued)

*Primary Examiner* — Dinku W Gebresenbet
(74) *Attorney, Agent, or Firm* — Klarquist Sparkman, LLP

(57) ABSTRACT

A process for providing a plurality of exploration mode charts to supplement a base chart is provided herein. A request for exploration mode charts may be received. The request may include a data set definition. A total number of data points for the request may be determined based on the data set definition. A total number of exploration mode charts may be determined based at least in part on the total number of data points for the request. Chart data may be obtained for a plurality of exploration mode charts based on the data set definition. The plurality of exploration mode charts may include a number of charts less than or equal to the total number of exploration mode charts. The plurality of exploration mode charts may be rendered via the chart data. The rendered exploration mode charts may be provided.

19 Claims, 15 Drawing Sheets

(56) References Cited

U.S. PATENT DOCUMENTS

| | | | |
|---|---|---|---|
| 2014/0040805 A1* | 2/2014 | Brereton | G06Q 10/10 |
| | | | 715/771 |
| 2014/0223350 A1* | 8/2014 | Woodward | G06F 3/0486 |
| | | | 715/771 |
| 2016/0267090 A1 | 9/2016 | Mavinakuli et al. | |
| 2017/0052955 A1 | 2/2017 | Nandy et al. | |
| 2017/0177320 A1 | 6/2017 | Sreedharan et al. | |
| 2018/0004851 A1* | 1/2018 | Zarins | G06F 16/9535 |
| 2018/0150210 A1 | 5/2018 | Pavanje et al. | |

OTHER PUBLICATIONS

Battle et al., "Dynamic Reduction of Query Result Sets for Interactive Visualization," *IEEE International Conference on Big Data*, 8 pages (2013).

Bresenham, "Algorithm for Computer Control of a Digital Plotter," *IBM Systems Journal*, vol. 4, No. 1, pp. 25-30 (1965).

Burtini et al., "Time Series Compression for Adaptive Chart Generation," *IEEE Canadian Conf. on Electrical and Computer Engineering*, 6 pp. (May 2013).

Chen et al., "Approximate Line Scan-Conversion and Antialiasing," *Computer Graphics Forum*, pp. 69-78 (1999).

Douglas et al., "Algorithms for the Reduction of the Number of Points Required to Represent a Digitized Line or its Caricature," *Cartographica Journal*, vol. 10, No. 2, pp. 112-122 (1973).

Eick et al., "Visual Scalability," NISS Technical Report No. 106, 28 pp. (Jun. 2000).

Eick et al., "Visual Scalability," *Journal of Computational and Graphical Statistics*, vol. 11, No. 1, pp. 22-43 (2002).

Esling et al., "Time-Series Data Mining," *ACM Computing Surveys*, vol. 45, No. 1, 34 pp. (Nov. 2012).

Färber et al., "SAP HANA Database-Data Management for Modern Business Applications," *SIGMOD Record*, vol. 40, No. 4, pp. 45-51 (Dec. 2011).

Fu, "A Review on Time Series Data Mining," *Engineering Applications of Artificial Intelligence*, vol. 24, No. 1, pp. 164-181 (2011).

Fu et al., "Representing Financial Time Series Based on Data Point Importance," *Engineering Applications of Artificial Intelligence*, vol. 21, No. 2, pp. 277-300 (2008).

Heer et al., "Interactive Dynamics for Visual Analysis," *Communications of the ACM*, vol. 55, No. 4, pp. 45-54 (Apr. 2012).

Hershberger et al., "Speeding Up the Douglas Peucker Line-Simplification Algorithm," *Proc. 5th Int'l. Symp. on Spatial Data Handling*, pp. 134-143 (1992).

Jerzak et al., "The DEBS 2012 Grand Challenge," *Proc. of the 6th ACM Int'l Conf. on Distributed Event-Based Systems*, 6 pp. (Jul. 2012).

Keim et al., "Pushing the Limit in Visual Data Exploration: Techniques and Applications," *Lecture Notes in Artificial Intelligence*, pp. 37-51 (2003).

Keogh et al., "A Simple Dimensionality Reduction Technique for Fast Similarity Search in Large Time Series Databases," *Proc. Pacific-Asia Conf. on Knowledge Discovery and Data Mining*, pp. 122-133 (2000).

Kolesnikov, "Efficient Algorithms for Vectorization and Polygonal Approximation," Academic Dissertation, University of Joensuu, 85 pp. (2003).

Kumar et al., "Time-Series Bitmaps: A Practical Visualization Tool for Working with Large Time Series Databases," *SIAM Data Mining Conf.*, 13 pp. (Apr. 2005).

Lindstrom et al., "Fast and Efficient Compression of Floating-Point Data," *IEEE Trans. on Visualization and Computer Graphics*, vol. 12, No. 5, pp. 1245-1250 (Sep. 2006).

Ma et al., "A Framework for Adaptive Content Delivery in Heterogeneous Network Environments," *Proc. SPIE, Multimedia Computing and Networking*, vol. 3969, pp. 86-100 (2000).

Mutschler et al., "The DEBS 2013 Grand Challenge," *Proc. of the 7th ACM Int'l Conf. on Distributed Event-Based Systems*, 6 pp. (Jun. 2013).

Office of Electricity Delivery & Energy Reliability, "Smart Grid," 5 pp., downloaded from http://energy.gov/oe/technology-development/smart-grid (Jan. 2014).

Przymus et al., "Recursive Query Facilities in Relational Databases: A Survey," *Database Theory and Application, Bio Science and Bio-Technology Communications in Computer and Information Science*, vol. 118, pp. 89-99 (2010).

Reumann et al., "Optimizing Curve Segmentation in Computer Graphics," *Proc. of the Int'l Computing Symp.*, pp. 467-472 (1974).

Shi et al., "Performance Evaluation of Line Simplification Algorithms for Vector Generalization," *The Cartographic Journal*, vol. 43, No. 1, pp. 27-44 (Mar. 2006).

Shneiderman, "Extreme Visualization: Squeezing a Billion Records into a Million Pixels," *Proc. of the 2008 ACM SIGMOD international conference on Management of Data*, 10 pp. (Jun. 2008).

Visvalingam et al., "Line Generalisation by Repeated Elimination of Points," *The Cartographic Journal*, vol. 30, No. 1, pp. 46-51 (1993).

Wang et al., "Image Quality Assessment: From Error Visibility to Structural Similarity," *IEEE Trans. on Image Processing*, vol. 13, No. 4, pp. 600-612 (Apr. 2004).

Wesley et al., "An Analytic Data Engine for Visualization in Tableau," *Proc. of the 2011 ACM SIGMOD Int'l Conf. on Management of Data*, pp. 1185-1194 (Jun. 2011).

Wu et al., "A Comparison of DFT and DWT Based Similarity Search in Time-Series Databases," *ACM 9th Int'l Conf. on Information and Knowledge Management*, pp. 488-495 (Nov. 2000).

Muigg et al., "A Four-level Focus+Context Approach to Interactive Visual Analysis of Temporal Features in Large Scientific Data," *Eurographics/IEEE-VGTC Symposium on Visualization*, 27:775-782 (2008).

Wickham, "Bin-Summarise-smooth: A framework for visualizing large data," 9 pages (Oct. 2013).

\* cited by examiner

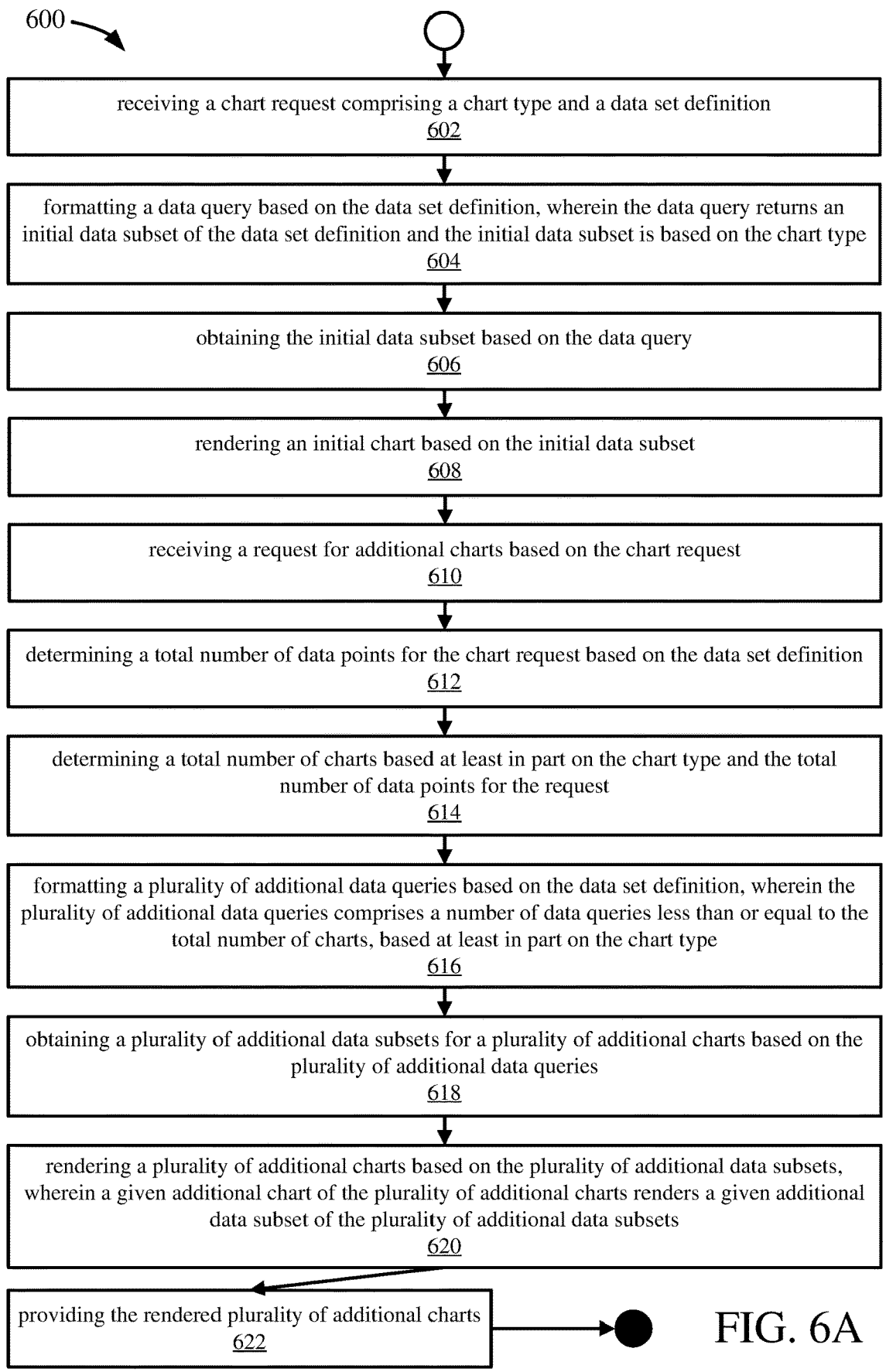

DYNAMIC DATA RETRIEVAL AND ANALYTICAL CHART RENDERING FOR DATA SETS

FIELD

The present disclosure generally relates to analytical charts, and rendering large-scale charts. Particular implementations relate to obtaining large amounts of data points for analysis, and systems and methods for rendering large-scale analytical charts using large amounts of data.

BACKGROUND

Analytical applications may render data in a chart, such as for analysis by a user. The time to render the chart may depend on the amount of data to be shown in the chart. The time needed to obtain the data from a data source, the time to render the data in the chart, or both, may be significant. Further, rendering large numbers of data points can result in the bulk of the data points overlapping and so becoming visually unusable. To accelerate the process and render a chart faster, or to alleviate excess data point overlap, some analytical applications limit the amount of data shown in a chart. While such an approach may provide the rendered chart faster or make the data points clearer, it also may provide less data in the chart than may be available or desired for analysis. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A process for generating a plurality of charts is provided herein. A chart request, including a chart type and a data set definition, may be received. A data query based on the data set definition may be formatted. The data query may return an initial data subset of the data set definition, and the initial data subset may be based on the chart type. The initial data subset may be obtained based on the data query. An initial chart may be rendered based on the initial data subset.

A request for additional charts based on the chart request may be received. A total number of data points for the chart request may be determined based on the data set definition. A total number of charts may be determined based at least in part on the chart type and the total number of data points for the request. A plurality of additional data queries based on the data set definition may be formatted. The plurality of additional data queries may include a number of data queries less than or equal to the total number of charts, based at least in part on the chart type. A plurality of additional data subsets may be obtained for a plurality of additional charts based on the plurality of additional data queries. A plurality of additional charts may be rendered based on the plurality of additional data subsets. A given additional chart of the plurality of additional charts may render a given additional data subset of the plurality of additional data subsets. The rendered plurality of additional charts may be provided.

A process for providing a plurality of exploration mode charts to supplement a base chart is provided herein. A request for exploration mode charts may be received. The request may include a data set definition. A total number of data points for the request may be determined based on the data set definition. A total number of exploration mode charts may be determined based at least in part on the total number of data points for the request. Chart data may be obtained for a plurality of exploration mode charts based on the data set definition. The plurality of exploration mode charts may include a number of charts less than or equal to the total number of exploration mode charts. The plurality of exploration mode charts may be rendered via the chart data. The rendered exploration mode charts may be provided.

A system for displaying analytical charts may perform user interface generation operations according to a process. A chart request to display a dataset may be received. A partial chart may be displayed in response to the chart request. The partial chart may represent a subset of the dataset requested in the chart request. An exploration mode indicator may be displayed in association with the partial chart.

A first input for activating the exploration mode indicator may be received. A first chart set may be displayed in response to activation of the exploration mode indicator. The first chart set may include a main chart having a main chart indicator and one or more primary charts having respective primary chart indicators. A helper chart indicator may be displayed in association with the first chart set.

A second input for activating the helper chart indicator may be received. A second chart set may be displayed in response to activation of the helper chart indicator. The second chart set may include one or more helper charts having respective helper chart indicators. Further, the second chart set may be displayed in association with the first chart set.

The foregoing and other objects, features, and advantages of the invention will become more apparent from the following detailed description, which proceeds with reference to the accompanying figures.

BRIEF DESCRIPTION OF THE DRAWINGS

FIG. 6A is a flowchart illustrating a process for generating a plurality of charts.

DETAILED DESCRIPTION

Figure 1A:
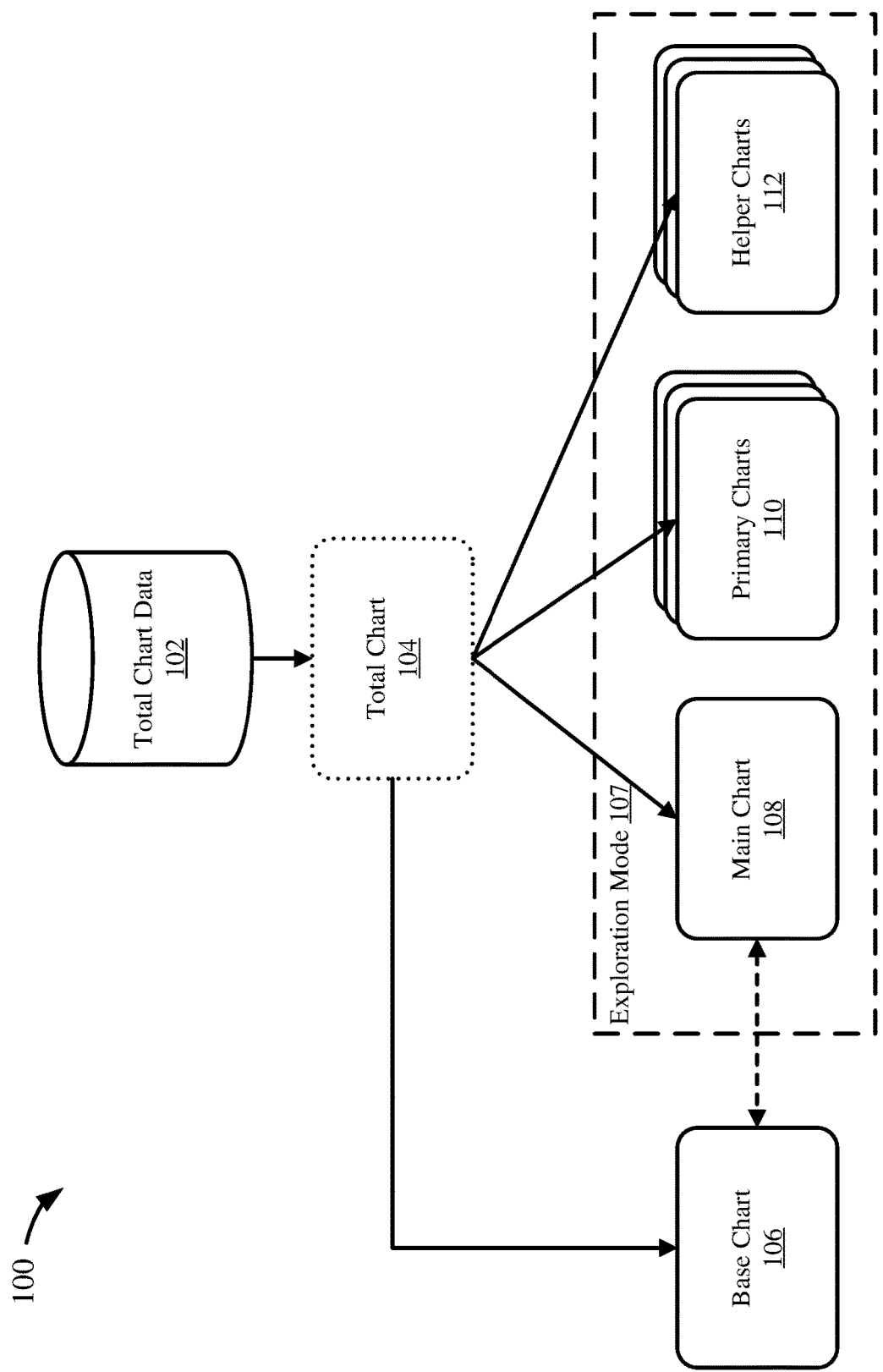
FIG. 1A is a schematic diagram depicting an analytical chart arrangement.

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Example 1—Exploration Charts Overview

Analytical applications may render data in a chart, such as for analysis by a user. The time to render the chart may depend on the amount of data to be shown in the chart. The time needed to obtain the data from a data source, the time to render the data in the chart, or both, may be significant. Further, rendering large numbers of data points can result in the bulk of the data points overlapping and so becoming visually unusable. To accelerate the process and render a chart faster, or to alleviate excess data point overlap, some analytical applications limit the amount of data shown in a chart. While such an approach may provide the rendered chart faster or make the data points clearer, it also may provide less data in the chart than may be available or desired for analysis.

Visualizing data according to the present disclosure may remedy (e.g., reduce) or avoid any or all of these problems. Generally, generating exploration charts according to the present disclosure allows visualization of data regardless of the volume of data points while improving system performance, providing at least partial visualization faster, and avoiding bulk data overlap, thus making the charts more effective for users.

A user may request visualization of a set of data. Such a request may have a total number of data points, such as 1,000,000. Further, such a request may generally be representable by a data query, such as may be used to obtain the data from a database.

A user may request visualization of data in a particular type of chart. Different chart types may have different maximum numbers of data points that can be rendered in the chart, such as for a particular screen size, screen resolution, etc. For example, a bar chart may render 10,000 data points at most, a cross tab chart may render 100,000 data points at most, or a line chart may render 10,000 data points at most. In some cases, the chart types may have a range of data points that can be rendered. For example, a bar chart may render between 10,000 and 100,000 data points. A chart matrix may be used to maintain the maximum number of data points each available chart type may render, or the range of data points. Such a chart matrix may be configurable by a technical user or system administrator, based on the available chart type rendering functionality.

As an example, a user may request a bar chart for the number of deliveries made in a set of countries. This request may have 800,000 data points. Rather than attempt to render the entire data set in a single chart, or only render a fraction of the data, or prompt the user to select a smaller data set, a computing system may proceed to render the bar chart request according to the present disclosure.

Based on a bar chart that can render, at most, 100,000 data points, the computing system can determine that a total of eight bar charts are needed to fully render the chart request. An initial chart may be rendered and displayed for the first 100,000 data points, with a notice that not all data is shown and button made available to show more data. Such a button may be used to enter or activate a chart exploration mode.

Clicking on the chart exploration mode button may open or initiate chart exploration mode, and begin rendering and displaying additional exploration mode charts. In some embodiments, all eight charts needed to render all the data may be provided at once. In other embodiments, a limited number of charts may be rendered at a time, which may generally improve performance and provide the charts faster to the user. For example, only three charts may be rendered at first. A button may be provided to render an additional three charts, and so on until all charts (eight in this example) are rendered and displayed. Thus, for this example, the first three charts may render and display the first 300,000 data points (100,000 in each respectively). If the user selects to view more charts, the next 300,000 data points may be rendered and displayed along with the initial three exploration mode charts. Thus, now six charts are displayed, respectively representing 600,000 data points. The final 200,000 data points may be displayed in a last two charts when the user selects to view them. Alternatively, a display of additional charts may replace a display of earlier charts (e.g., selecting to view the last three charts may result in a display of the last three charts instead of, rather than addition to, the first three charts).

If the chart request had 850,000 data points, the last bar chart may render and display the last 50,000 data points (e.g. the remainder). In other embodiments, the data points may be divided more evenly, or partitioned according to other logical rules. For example, in the request for deliveries by country, the charts may be separated by country. Divisions of partitions of data can result in one or more charts for a particular category. For instance, if data for a single country exceeds a size for a single chart, it can be further partitioned or divided based on additional criteria (e.g., based on date, city, or some other criteria).

The exploration mode charts now display all 800,000 data points for the chart request (number of deliveries in the set of countries). A user may manipulate the charts, either all together or each individually, such as by applying filters or other analytical actions. In this way, the user has been provided visualization of the total data set, while avoiding having a single unreadable chart (due to the massive number of data points). Further, the charts may be provided faster, as each is much smaller than the single large requested chart. Moreover, the exploration charts may also be processed in parallel, thereby further increasing (e.g. improving) performance.

The user may exit the exploration mode when completed with the charts. Thus, the exploration mode disclosed herein may be integrated with other analytical or visualization applications while still providing existing or other analytics functionality.

Example 2—Analytical Charts

FIG. 1A is a schematic diagram depicting an analytical chart arrangement 100. A requested chart, such as requested by a user, may have total chart data 102 for rendering in the chart. The total chart data 102 may be the set of all data points from one or more data sources that would be returned by the query associated with the chart, when a single query is used to request all data, or the sum of multiple queries if the data points are grouped according to one or more criteria. The total chart data 102 may be rendered into a total chart 104. However, in scenarios where the total chart data 102 is very large, the total chart 104 may not be rendered, or may not be rendered without negative performance or usability issues.

The total chart data 102 may be rendered as a base chart 106 and multiple charts (i.e., 108, 110, 112) in an exploration mode 107. Such base charts 106 or exploration mode charts 108, 110, 112 may be rendered alternative to the total chart 104, or in some embodiments in addition to the total chart. A base chart 106 may be rendered along with the charts 108, 110, 112, in exploration mode 107, however, in some embodiments a base chart 106 may be rendered without rendering the exploration mode charts.

Generally, a base chart 106 may render a subset of the total chart data 102. The subset of data rendered in a base chart 106 may be determined by rules for partitioning the total chart data. Such partition rules may be based on query predicates or filters for the total chart data 102. For example, if a query predicate filters the total chart data 102 to data for a given year, a partition rule for rendering charts may be to render the base chart 106 for a given month of that year. Such partition rules may also be rules such as rendering a set number of initial data points, or a particular (e.g. statistical or algorithmic) sampling of data points, or other rules. The subset of data rendered in a base chart 106 may additionally or alternatively be determined based on chart functionality, such as a total number of data points renderable in the base chart, a total number of data points renderable in a given amount of time (e.g. an efficiency parameter), a total number of data points readily available (e.g. already received from a data source when the chart rendering begins), and so on. The base chart 106 may be displayed separate from the charts 108, 110, 112 in exploration mode 107, and in some scenarios it may be displayed in place of the exploration mode charts.

The charts in exploration mode 107 may be classified as a main chart 108, a primary chart 110, or a helper chart 112. Generally, all the data points in the total chart data 102 may be rendered across all the exploration mode 107 charts 108, 110, 112, such that all data points in the total chart data are available for analysis across all exploration mode charts. In some embodiments, data points from the total chart data 102 may be rendered in only one of the charts in exploration mode 107, such that a given data point is rendered in only one exploration mode chart. In other embodiments, data points from the total chart data 102 may be rendered in multiple charts in exploration mode 107, depending on how the charts are filtered and partitioned. The charts in exploration mode 107 may be displayed separately from the base chart 106, and in some scenarios, it may be displayed in place of the base chart.

In one embodiment, the maximum number of charts in exploration mode 107 is the total number of data points in the total chart data 102 divided by the maximum number of data points supported or renderable in a given chart, plus an additional chart for any remainder (e.g., for 5,100 data points, at 1,000 data points per chart, 6 charts would be used, absent any other grouping or partitioning criteria for the data points, such as grouping by country as discussed above). The maximum number of data points supported by a given chart may be based on the chart type or a configurable setting for charts or the chart type, or by some other configurable setting or rule.

Generally, there is only one main chart 108 in exploration mode 107, and always at least one main chart. The main chart 108 is generally the first chart rendered in exploration mode 107, or one of a set of charts first rendered in exploration mode (e.g. if not all exploration mode charts are rendered once exploration mode is entered). The main chart 108 may be rendered based on the base chart 106, data for the base chart, or may be a direct copy of the base chart 106 (when first opened); in other embodiments, the base chart (or the data for the base chart) may be passed by reference to be used as the main chart.

The main chart 108 may act as a final chart for all the charts 108, 110, 112 of the exploration mode 107. Thus, the main chart 108 is generally the chart that is used to generate the base chart 106 when the base chart is viewed in place of the exploration mode 107 charts 108, 110, 112, such as when exploration mode is hidden or closed. In such a scenario, the main chart 108 may simply replace the base chart 106, or the data points for the main chart may be used to re-render the base chart based on any rules or filters attached or attributed to the base chart. Replacing the base chart 106 with content of the main chart 108 can be useful, for example when changes have been made to data rendered in the main chart compared with a prior version of the base chart, such as if filters or other analytical operations were applied to the main chart 108, or if labels or other display parameters were added or changed in the main chart compared with the prior version of the base chart 106. In at least some aspects, it can be determined whether the main chart 108 has been changed relative to the base chart 106. If no change is detected, the prior base chart can be reused.

Generally, global analytical operations are applied automatically to the main chart 108. Global analytical operations may include refreshing, data filtering, segmenting, changing chart type, page or story filters, and so on. Global analytical operations can be applied as a result of user input operations, such as via a graphical user interface, or in response to commands received from a program, such as from an application via an API.

There may be one or more primary charts 110 in exploration mode 107. Generally, primary charts 110 behave similarly to the main chart 108 but are not related to the base chart 106 (e.g. do not replace the base chart when exiting exploration mode 107, as described herein). In some embodiments, the primary charts 110 may be limited to a finite number of charts. For example, exploration mode 107 may be configured to set the number of primary charts 110 to a fixed number (e.g. three) or to a configurable setting that sets the number of primary charts to a fixed number or another metric for limiting the number of primary charts (e.g. percentage of total charts). In some embodiments, primary charts 110 may render analytical actions applied on the main chart 108. For example, if a filter is applied to the main chart 108, the same filter operation can be applied to any primary charts 110, either automatically or manually.

Generally, global analytical operations are applied automatically to the primary charts 110. Global analytical operations may include refreshing, data filtering, segmenting, changing chart type, page or story filters, and so on. Primary charts 110 may be the first set of charts in exploration mode 107 rendered that are not the main chart 108. Limiting the number of primary charts 110 may improve computing system performance and efficiency by limiting the number of charts to which a global action is automatically applied. Thus, the global action can be applied faster, providing the results faster to a user.

There may be one or more helper charts 112 in exploration mode 107. Generally, helper charts 112 are the further charts needed to display the remaining total chart data 102 not rendered in the main chart 108 or a primary chart 110. In general, global actions are not automatically applied to helper charts 112, but may be applied manually, such as by refreshing an individual helper chart or selecting to apply the global action to the helper chart (e.g. through a local action on the helper chart).

In some embodiments, helper charts 112 may only be rendered in exploration mode 107 when directed, such as by a user, instead of automatically rendering when exploration mode is entered, such as with the main chart 108 or the primary charts 110. In some scenarios, all helper charts 112 may be rendered when directed; in other scenarios, a set number of helper charts may be rendered when directed, such as a fixed number, an input number, or a configurable setting indicating the number of helper charts to render at a time.

Generally, analytical actions similar to global actions may be applied directly to individual charts, such as the base chart 106 or exploration mode 107 charts 108, 110, 112.

In some embodiments, when displaying exploration mode 107 charts 108, 110, 112, the main chart 108 or primary charts 110, or both, may be arranged to be the most visible charts, such as the first in a list or at the top of the screen (e.g. before helper charts 112).

Example 3—Exploration Mode Charts Hierarchy

Figure 1B:
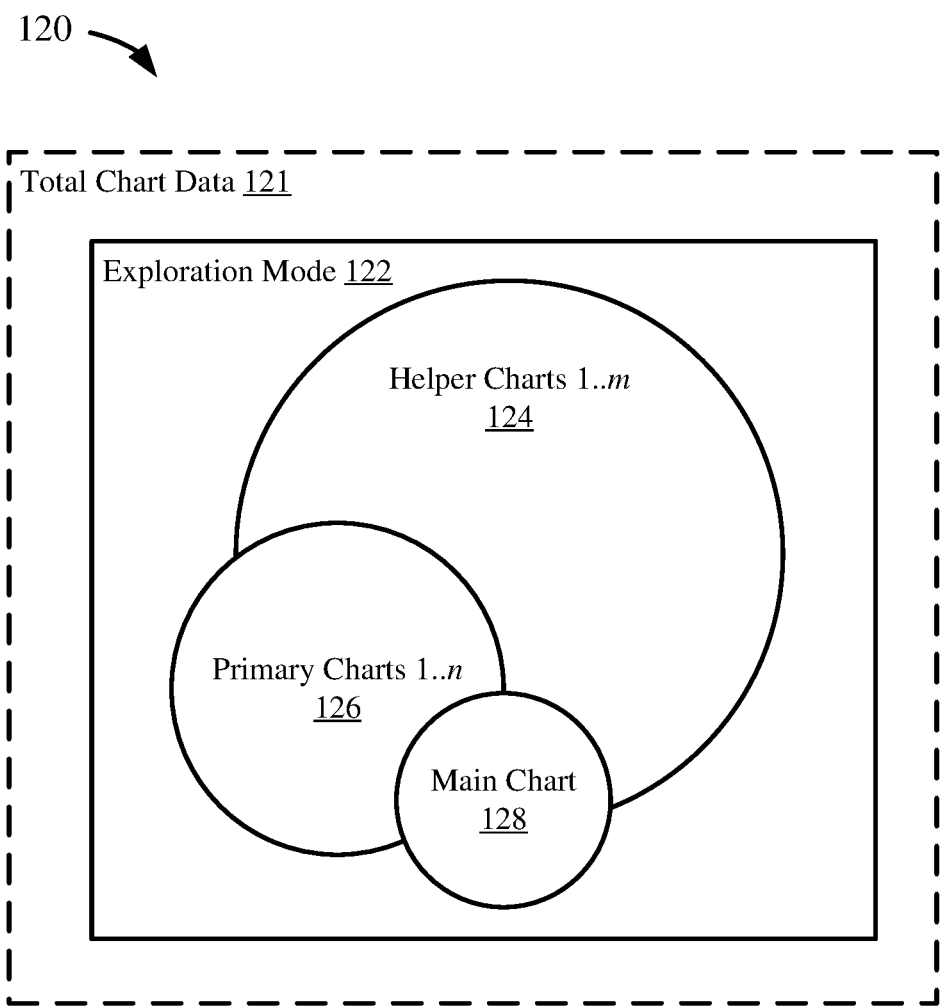
FIG. 1B is a diagram depicting interrelationships between exploration mode charts.

FIG. 1B is a diagram depicting interrelationships 120 between charts in exploration mode 122. As described herein, charts in exploration mode 122 may be classified as a helper chart 124, a primary chart 126, or a main chart 128. Generally, the charts in exploration mode 122 will render and display, or are capable or rendering and displaying (e.g., as selected by a user), the total chart data 121 requested.

Exploration mode 122, for viewing the total chart data 121, may have helper charts 1 . . . m 124, primary charts 1 . . . n 126, and main chart 128. Generally, if a chart in exploration mode 122 is not a primary chart 126 or a main chart 128, it is a helper chart 124. Thus, a helper chart 124 may be considered to be a default classification for a chart in exploration mode 122. Further, helper charts 1 . . . m 124 may be used to render data points from the total chart data 121 not rendered by primary charts 1 . . . n 126 or the main chart 128. Generally, a primary chart 126 has all the functionality of helper charts 124, plus additional functionality for primary charts; a main chart 128 generally has all the functionality of primary charts 126 and helper charts 124, plus additional main chart functionality.

A helper chart 124 may be re-classified as a primary chart 126 or as the main chart 128. In some embodiments, the exploration mode 122 may have a limited number of primary charts 126. In such scenarios, reclassifying a helper chart 124 to a primary chart 126 also reclassifies a primary chart to a helper chart. Similarly, in some embodiments, the exploration mode 122 may have a single main chart 128. In such scenarios, reclassifying a helper chart 124 to the main chart 128 also reclassifies the main chart to a helper chart.

A primary chart 126 may be reclassified as the main chart 128. In such scenarios, the main chart 128 may be reclassified as a primary chart 126. If not automatically reclassified as a primary chart 126, the main chart 128 becomes classified as a helper chart 124 (or, the main chart can be classified as a primary chart, and another primary chart can be classified as a helper chart if a total number of primary charts has been exceeded).

The main chart 128 may be reclassified as a primary chart 126 or a helper chart 124. In such cases, a primary chart 126 or a helper chart 124 may be automatically selected and reclassified as the main chart 128; such selection may be a simple selection, such as first in a list, or may be done algorithmically, such as by identifying and selecting the most used chart 126, 124. In other embodiments, a warning or a prompt to select a main chart 128 may be provided to a user when the main chart is reclassified.

Thus, any chart in exploration mode 122 may be reclassified to any other classification 124, 126, 128. In this way the total number of charts in exploration mode 122 remains the same, as does the total number of charts in each classification. In some embodiments, the total number of primary charts 126 or the main chart 128 may be a fixed number or a configurable setting. Generally, helper charts 124 are any charts that are not a primary chart 126 or a main chart 128, and so the total number of helper charts may be based on the total number of charts in exploration mode charts needed to render the total chart data 121.

The following table delineates at least some of the chart functionality based on chart classification. Other chart functionality may be provided, in some embodiments by chart classification, as described herein.

| Functionality | Chart Classifications |
| --- | --- |
| Replaces Base Chart when exiting Exploration Mode. | Main Chart |
| Global Action automatically applied. | Main Chart, Primary Chart |
| Render portion of data requested for visualization. | Main Chart, Primary Chart, Helper Chart |
| May be reclassified. | Main Chart, Primary Chart, Helper Chart |

Example 4—Exploration Mode Chart Data

Figure 1C:
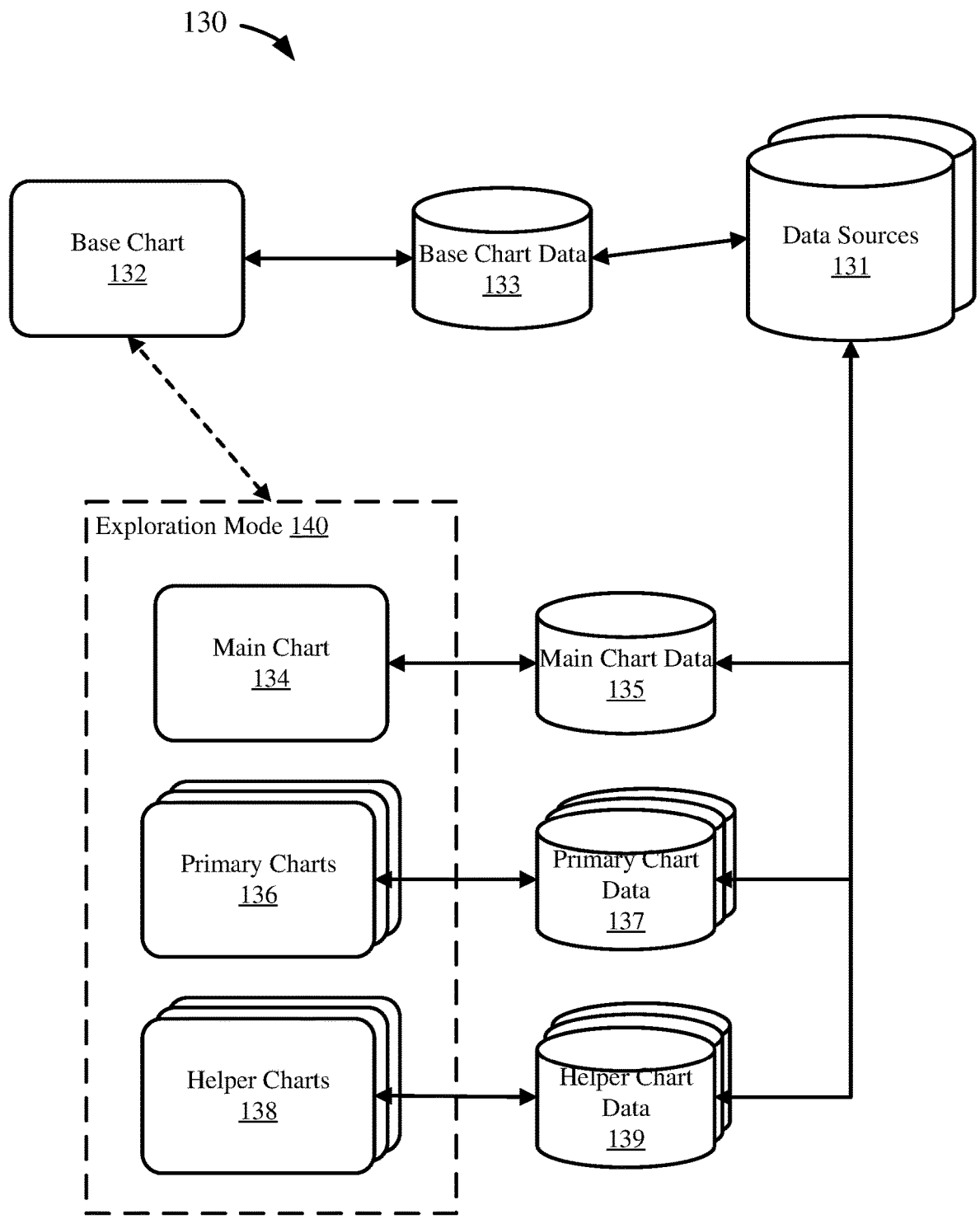
FIG. 1C is a schematic diagram depicting analytical charts with data sources.

FIG. 1C is a schematic diagram 130 depicting analytical charts with data sources. As described herein, a base chart 132 or charts in exploration mode 140, or both, may be used to render large data sets, such as data sets that cannot be rendered, or cannot be rendered efficiently, in a single chart, similarly as shown in FIG. 1A. Exploration mode 140 may have one or more charts, which may be classified as helper charts 138, primary charts 136, or a main chart 134, similarly as shown in FIGS. 1A-B. Generally, the exploration mode charts 140 together may render and display a large data set, such as a data set obtained from one or more data sources 131.

A base chart 132 may have base chart data 133. Base chart data 133 may be a set of data points that are rendered in the base chart 132. Base chart data 133 may be obtained from one or more data sources 131, and generally may be a subset of data from the data sources. The base chart data 133 may be obtained from the data sources 131 and stored locally or remotely to the base chart 132. The base chart data 133 may be stored, for example, as results from a data base query, such as in a temporary table or in a separate database table.

Alternatively, the base chart data 133 may be stored in a data object or structure, such as in a JSON object.

When the base chart 132 is first rendered, the base chart data 133 may be obtained from the data sources 131. Thereafter, when the base chart 132 is altered or manipulated, such as by applying a filter or re-rendering, the base chart data 133 may be accessed without accessing the data sources 131. Thus, system performance for the base chart 132 may be improved.

The base chart 132 may relate to one or more charts in the exploration mode 140. In some embodiments, the main chart 134 may be the base chart 132 in exploration mode 140, or may be a copy of the base chart. In other embodiments, the base chart 132 may represent different portions of the charts in the exploration mode 140; for example, the base chart may render an amalgamation of data subsets from the separate exploration mode charts.

A main chart 134 may have main chart data 135, similar to the base chart 132. In some embodiments, the main chart data 135 may also be the base chart data 133, or a copy of the base chart data. In other embodiments, the main chart data 135 may be obtained or stored separately from the base chart data 133.

The primary charts 136 may have primary chart data 137, similar to the base chart 132. Each primary chart 136 may have a separate primary chart data set 137, which may be obtained or stored separately from the other primary charts. For example, each primary chart 136 may have a separate data object instantiated to store primary chart data 137 for that primary chart.

The helper charts 138 may have helper chart data 139, similar to the base chart 132. Each helper chart 138 may have a separate helper chart data set 139, which may be obtained or stored separately from data for the other helper charts. For example, each helper chart 138 may have a separate data object instantiated to store helper chart data 139 for that helper chart.

The chart data sources 133, 135, 137, 139 may be cached data sources. Data queries or subqueries, global actions, local actions, rendering or re-rendering of charts, or other actions as described herein utilizing chart data may be executed or otherwise performed against the chart data sources 133, 135, 137, 139. The chart data sources 133, 135, 137, 139 may be accessed in place of the data sources 131.

The chart data sources 133, 135, 137, 139 may be removed (e.g. memory released) when their corresponding chart is closed, or, alternatively or additionally, when the exploration mode 140 is closed, when an amount of memory used by chart data has been exceeded, or based on other criteria.

Generally, the main chart data 135, the primary chart data sets 137, and the helper chart data sets 139 contain the total data to be rendered, such as the total chart data 102 shown in FIG. 1A or the total chart data 121 shown in FIG. 1B.

Example 5—Exploration Mode Process

Figure 2A:
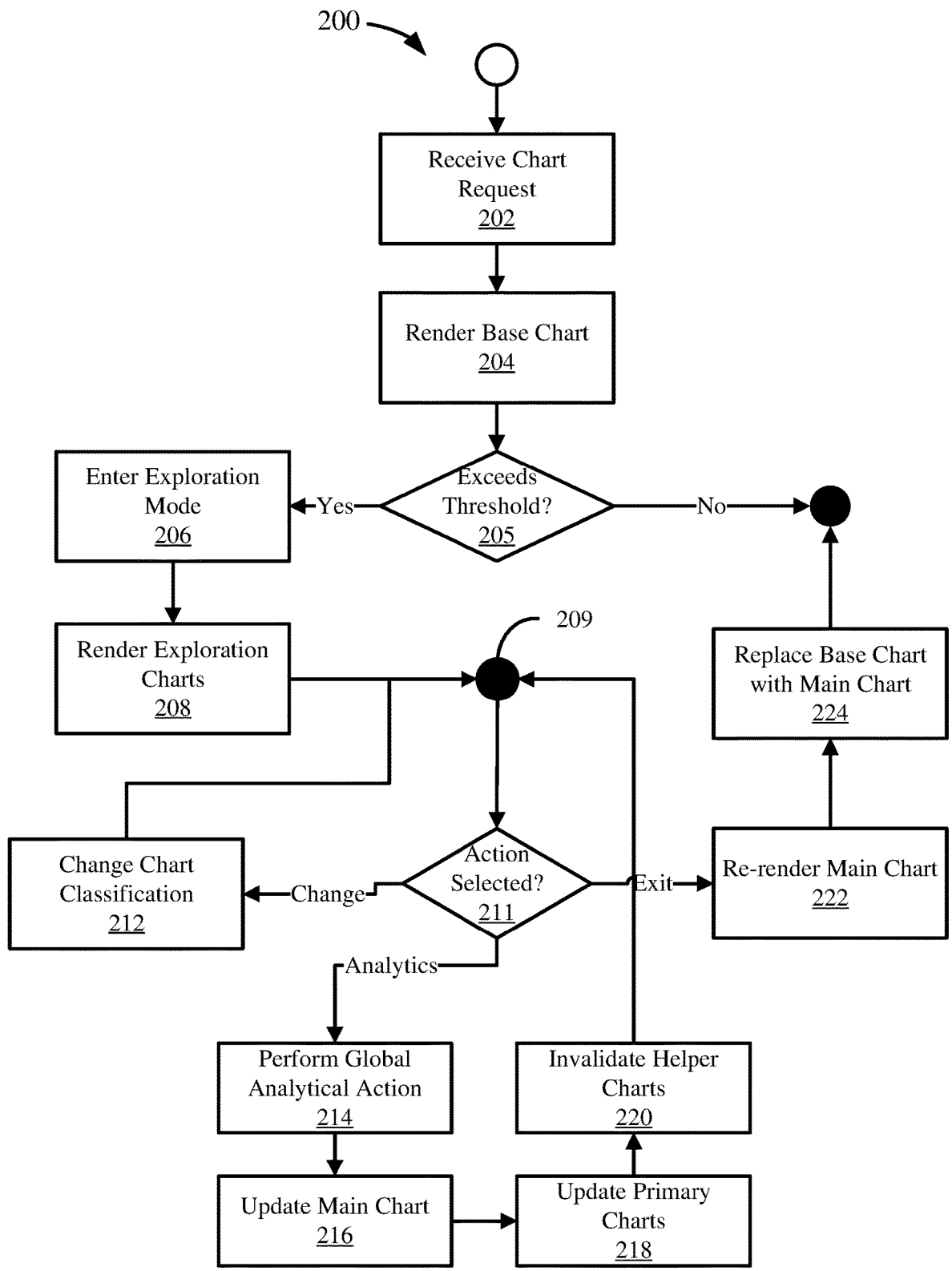
FIG. 2A is a flowchart illustrating a process for rendering large data sets in charts.

FIG. 2A is a flowchart illustrating a process 200 for rendering large data sets in charts. The process 200 for rendering large data sets in charts may be provided as a service (e.g. SaaS), or may be incorporated into another process, another program, or another system. A request for a chart may be received at 202. The request may be received from a user interface. Alternatively, the request may be received through an Application Program Interface (API), such as between programs or across a network, or through a microservices message queue, or otherwise between programs or systems.

The chart request at 202 may include information about the data to be rendered in the chart. The chart request may include a query (e.g., a SQL query or a query in another query language, or in a format that can be converted to such a query) for obtaining the data for rendering in a chart, or parameters for selecting the data, or that define the data set, for rendering in the chart. A chart request may include data filters or query predicates that, at least in part, define or determine the data for rendering in the chart. In some embodiments, a chart request at 202 may already include the data set for rendering in a chart, or a reference to a data set. For example, the request can include a file containing the data or can include a reference to such a file, or other data source. Generally, a data set may be the set of data points to be rendered in a chart, or may be a data set that contains the data points for rendering, but any filters or predicates may be applied to determine the actual data for rendering.

A base chart may be rendered at 204. Rendering a base chart may include obtaining the data to be rendered in the base chart based on the chart request received at 202. Obtaining the data may include executing a query against a data source, or otherwise accessing the data to be rendered. Rendering a base chart may include determining a total number of data points to render based on the received chart request, and further, limiting the total number of data points to render for the base chart. Such a limitation may be based on the total number of data points the requested chart type may be capable of rendering. For example, a chart matrix may provide the maximum number of renderable data points for one or more chart types. Such a chart matrix may be accessed at 204 to determine the number of data points to obtain and render in the base chart. The number of results or data points may be limited in a query against a data source based on the chart matrix. Such a matrix may be used for exploration mode charts as well, as described herein.

Once the data set is obtained, the base chart may be rendered at 204. The rendered base chart may be displayed, such as in a user interface, or may be sent as a data object to a program or system for display.

The process 200 determines if the total number of data points to render the chart requested at 202 exceeds a threshold at 205. The threshold may be the number of data points rendered or renderable in the base chart. In some embodiments, the threshold may be lower than the number of data points renderable in the base chart, based on partitioning options or rules for the total data points for the chart request. If the total number of data points to render in the chart request does not exceed the number of data points rendered or renderable in the base chart, then the process 200 completes ("no" at 205); generally, this is because the base chart rendered at 204 satisfies the chart request at 202 by rendering all the requested data points.

If the total number of data points to render in the chart request exceeds the number of data points rendered or renderable in the base chart ("yes" at 205), then the process 200 proceeds to enter exploration mode at 206. In some embodiments, the transition to enter exploration mode at 206 may be initiated by a request, such as via a user interface, to enter exploration mode; such a request may be accomplished by activation of a widget or other user interface device, indicating to enter exploration mode. In some embodiments, the transition to entering exploration mode at 206 may be automatic, or may begin automatically in the background.

Exploration mode may be entered at 206. Entering exploration mode at 206 may include determining or identifying a total number of data points to render based on the chart request received at 202. Additionally, upon entering exploration mode at 206, a total number of exploration charts needed to render the data in the chart request may be calculated. Generally, the number of exploration charts needed is the total number of data points for the requested chart divided by the total number of data points the requested chart can render, plus an additional chart for any remainder. The total number of data points the requested chart can render may be based on the requested chart type, or other configuration settings or parameters, which may be based on efficient data access, network traffic, processing efficiency, representational efficiency, data partitioning rules, or other parameters. For example, a chart partitioning rule may be used to divide a chart requesting data for a year into twelve charts, one for each month, if each chart is able to render the total data points for that month, even if fewer charts could be used.

Once the process 200 has entered exploration mode at 206, the exploration charts are rendered at 208. Rendering the exploration mode charts at 208 may include obtaining the data for the exploration mode charts. Obtaining the data may be done at once for all charts, and then divided amongst their respective charts, or separately for each chart. In some cases, data for a particular chart is retrieved when the corresponding chart is requested or activated by a user.

Once the data for rendering the charts is obtained at 208, the charts are then rendered. Rendering may include instantiating or formatting a chart object containing all the data points for a given chart, which may be passed to another system or to a user interface for displaying the chart.

The charts may be rendered at 208 in sequence, in parallel, or in groups either in sequence or in parallel. In some embodiments, all exploration mode charts may be rendered at once in sequence at 208; for example, a main chart may be rendered first, then a primary chart, and so on until all primary charts are rendered, then a helper chart and so on until all helper charts are rendered. In another embodiment, the charts may be rendered in parallel at 208; for example, the main chart, each of the primary charts, and each of the helper charts may be rendered separately in parallel (e.g. may be rendered in separate threads, or at separate processing nodes). In other embodiments, a first set of charts may be rendered, such as the main chart and the primary charts, and the remaining charts wait until the first set is complete before rendering, or until an indication is received to proceed with the rendering additional charts. In such scenarios, the charts in each group may be rendered in parallel as well. Thus, the process 200 may more efficiently utilize computing resources by rendering charts in parallel, or in finite groups or sets, or both, at 208.

Once the exploration mode charts are rendered at 208, the process proceeds to 209 where the charts are displayed for analysis, such as in a user interface. In general, once the charts are rendered, actions may be taken on the exploration mode charts at 209, such as through a user interface or a process/system API. In embodiments where the process 200 is provided as a service (e.g. SaaS), the process may be in an idle or available state, waiting for further instructions at 209. In such scenarios, the process 200 may end at 209 if no further instructions are received.

A variety of actions may be selected at 209 with respect to the exploration charts rendered at 208, or the exploration mode initiated at 206. Example actions that may be selected at 209 are changing the classification of an exploration mode chart, performing a global analytical action on the exploration mode charts, or exiting exploration mode. Other actions may include performing local analytical actions on a given exploration mode chart (generally, a local action applies to a single chart), rearranging the displayed exploration mode charts, highlighting data in the exploration mode charts, or changing a chart type for one or more of the exploration mode charts. An action to render further or additional exploration mode charts, such as if charts are rendered in sets or groups at 208, may be selected at 209.

If a change chart classification action is an action entered or selected at 209 ("change" at 211), one or more charts' classifications may be changed at 212. An exploration mode chart rendered at 208 may be re-classified similarly as shown in FIG. 1B. For example, a helper chart may be reclassified as a primary chart. In some embodiments, a single chart may be reclassified. Reclassification may be accomplished by selecting a chart classification widget in a user interface, or by passing a chart identifier and a preferred chart classification as arguments to the process 200, such as through an API. In other embodiments, at least two charts are re-classified by swapping the charts' classifications. Such functionality may be useful in embodiments where a fixed number of charts may be in a given classification, or may be necessary to have a fixed or minimum number of charts in a given classification. This may be accomplished by selecting a chart classification widget in a user interface for one or more charts, or by passing at least two chart identifiers as arguments to the process 200, such as through an API; such arguments may include at least one preferred chart classification for at least one chart provided as an argument.

In still other embodiments, chart re-classification at 212 may include automatically reclassifying one or more additional charts in response to reclassifying a first chart. For example, a helper chart may be reclassified as a primary chart, and an algorithm may select one of the primary charts to reclassify as a helper chart, such as by reclassifying the least used primary chart or the first primary chart listed.

In other embodiments, reclassification of a chart at 212 may not be permitted if the requested chart classification is not available. For example, if the number of primary charts allowed is a fixed at three and there are already three primary charts, the process 200 may prevent the helper chart from being reclassified to a primary chart at 212 until there are fewer than three primary charts. In some cases, a user can be alerted that a number of charts has been exceeded and prompted to close or reclassify charts to accomplish a desired reclassification.

Once the chart classification is changed at 212, the process 200 returns to 209, and is available for further actions with the rendered exploration mode charts.

If a global analytical action is entered or selected at 209 ("analytics" at 211), the global action is performed at 214. Generally, a global analytical action is an analytical action, such as filtering or repartitioning, which has a scope across the entire data set for the chart request, which generally means the action's scope is across all the exploration charts. This means the global analytical action is generally to be applied to all, or at least more than one, of the exploration mode charts, rather than being a local action for a single chart (for example, to be applied to the data in a single chart). In some embodiments, the global action performed at 214 may be several global actions, selected and then executed together.

Once the global action is performed at 214, the main chart may be updated at 216. Updating the main chart at 216 may include re-rendering the main chart, or otherwise changing the main chart to reflect the performed global action or actions.

After the main chart is updated at 216, the primary charts may be updated at 218. Updating the primary charts at 218 may include re-rendering the primary charts, or otherwise changing the primary charts to reflect the performed global action or actions; this may be similar to updating the main chart at 216. In some embodiments, the primary charts may be updated at 218 in parallel to the main chart at 216, rather than after or in sequence.

After the primary charts are updated at 218, the helper charts may be invalidated at 220. Invalidating the helper charts at 220 may include setting a flag or other indicator to represent that the charts have not been updated based on the global analytical action performed at 214. Further, invalidating the helper charts at 220 may include representing that the charts are invalidated in a user interface, such as by providing an invalidation marker, graying or otherwise visually obscuring the helper charts, moving the helper charts to an invalidated section, or other indicators. In some embodiments, the helper charts may be invalidated at 220 in parallel to the main chart at 216, or the primary charts at 218, being updated, rather than after or in sequence.

The helper charts may be updated at 220, similarly to the main chart at 216 or the primary charts at 218, by performing a local action on a helper chart to refresh or update the individual helper chart. Further, some embodiments may allow all helper charts to be updated or refreshed at once, or a selected set of helper charts to be updated or refreshed. In other embodiments, the helper charts may be updated at 220 in place of invalidating the helper charts. However, generally there is a performance benefit to invalidating the helper charts and updating as needed, rather than updating along with the main chart or primary charts.

Once the helper charts have been invalidated at 220, the process 200 returns to 209, and is available for further actions with the rendered exploration mode charts.

If exiting the exploration mode is an action entered or selected at 209 ("exit" at 211), the process 200 may begin to close the exploration mode entered at 206. The main chart may be re-rendered at 222. Re-rendering the main chart at 222 may include applying any global or local actions to the main chart, such as filtering the data in the chart or updating the chart to include any changed or additional data points. If there are no outstanding actions, additional data, or other changes to the main chart, the main chart may not be re-rendered at 222 and the process 200 will proceed having skipped this step; skipping re-rendering the main chart when no changes would be made to the chart may improve performance and efficiency of the process.

The base chart, rendered at 204, may be replaced with the main chart, re-rendered at 222, at 224. The exploration mode entered at 206 is then closed, and the process 200 completes. In this way, the main chart may still be rendered and displayed after the exploration mode is closed. This allows the base chart to display the main chart, which may have been altered or otherwise manipulated to reflect a user's analytical preferences or key data. In some embodiments, the process 200 may again be directed to enter exploration mode at 206 from the base chart after the process completes. Such a scenario may be directed by a widget in a user interface, or calling the process 200 through an API.

Example 6—Exploration Mode Chart Rendering Process

Figure 2B:
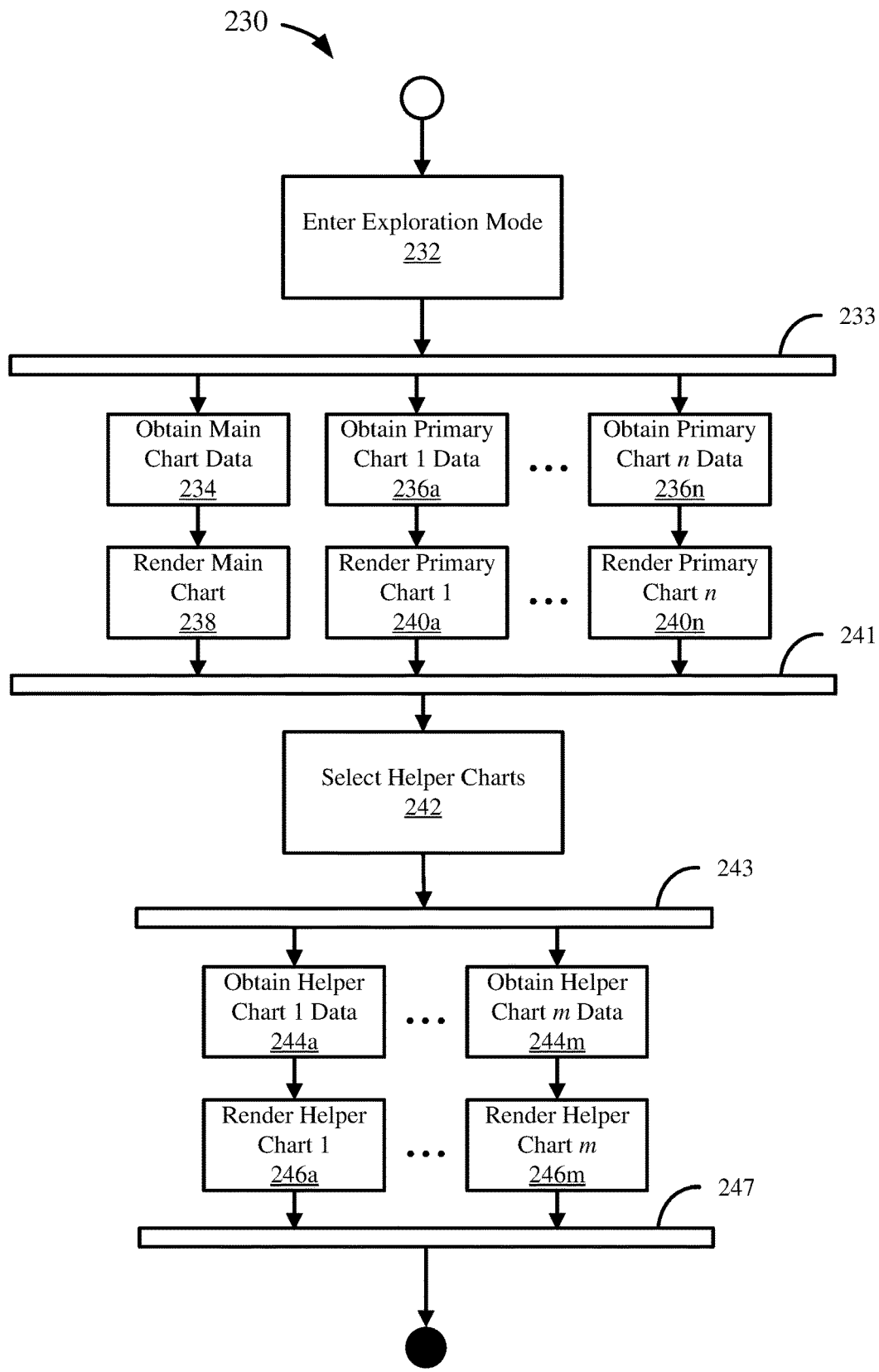
FIG. 2B is a flowchart illustrating a process for rendering exploration mode charts.

FIG. 2B is a flowchart illustrating a process 230 for rendering exploration mode charts. The process 230 for rendering exploration mode charts may be provided as a service (e.g. SaaS), may be incorporated into another process, such as process 200 in FIG. 2A, or incorporated into another program or system. A chart exploration mode may be entered at 232. Entering exploration mode at 232 may be similar to entering chart exploration mode at 206 in FIG. 2A.

Entering exploration mode at 232 may include determining or identifying a total number of data points to render. Additionally, upon entering exploration mode at 206, a total number of exploration charts needed to render the data in the chart request may be calculated. Generally, the number of exploration charts needed is the total number of data points for the requested chart divided by the total number of data points the requested chart can render, plus an additional chart for any remainder. The total number of data points the request chart can render may be based on the requested chart type, or other configuration settings or parameters, which may be based on efficient data access, network traffic, processing efficiency, representational efficiency, data partitioning rules, or other parameters. For example, a chart partitioning rule may be used to divide a chart requesting data for a year into twelve charts, one for each month, if each chart is able to render the total data points for that month, even if fewer charts could be used.

Entering exploration mode at 232 may include updating a user interface to represent exploration mode, such as by expanding a window or opening a new window. Entering exploration mode at 232 may also include generating or instantiating data objects for charts determined to be needed.

The process 230 may be parallelized at 233. Generally, the process 230 may be parallelized by obtaining processing threads from a thread pool or generating new process threads. For example, each chart to be rendered may be processed separately in its own thread or threads.

For each of the threads, main chart data may be obtained at 234. Obtaining main chart data at 234 may include accessing one or more data sources to obtain the data points for the main chart, such as shown in FIG. 1C. The one or more data sources may be local or remote data sources. Generally, accessing a data source may include executing a query against the data source, which then returns the requested data.

Obtaining main chart data at 234 may further include generating or formatting a query for execution against a data source. For example, a query for data showing number of deliveries by country may be:

```
SELECT DISTINCT
T10."C4" AS C4,
SUM(T10."C26") AS M1
FROM "NODE_146_71acfb8b_e18f_4bbc_8e6b_fdc6fd73dc15" T10
WHERE
((T10."F111" IS NOT NULL) AND (T10."F111" = V'Include'))
AND ((T10."C13" IN (V'V-B Salesorg.', V'V-CH Salesorg.', V'V-CZ Salesorg.', V'V-D SalesOrg.', V'V-E Salesorg.', V'V-EST Salesorg.', V'V-F Salesorg.', V'V-GB Salesorg.', V'V-I Salesorg.', V'V-LT Salesorg.', V'V-LV Salesorg.', V'V-NL Sales Org.', V'V-RO Salesorg.',
```

```
V'V-SLO Salesorg.')) AND (T10."C13" IS NOT NULL))
AND ((T10."C16" IN (V'Free of Charge Order', V'Standard Order')) AND (T10."C16" IS
NOT NULL))
AND ((T10."C1" IN (V'Baltic DC Riga', V'"Boskovice', V' Czech Republic (DC)"', V'DC
Italy - Verona', V'DC Valladolid', V'DSV Slovenia d.o.o.', V'GROSSLEHNA DC DE',
V'GÄRTRINGEN DC DE', V'HAMBURG DC DE', V'Kuehne & Nagel (AG & Co.) KG',
V'MAINZ DC DE', V'KÜHNE & NAGEL (AG & CO.) KG', V'VELUX C/O DSV Belgium
(DC)', V'VELUX C/O DSV GB (DC)', V'VELUX C/O RHENUS LOGISTICS- FR',
V'VELUX ROMANIA S.R.L.')) AND (T10."C1" IS NOT NULL))
GROUP BY
C4
ORDER BY
1 ASC limit 100000 offset 0
```

Further queries may be used to store the results, either locally or remotely, such as:

```
create table "DATAQUERY_66_1" ("id_2" varchar(*) NULL, "id_3" double NULL)
LOAD TABLE "DATAQUERY_66_1"("id_2" NULL('?'), "id_3" NULL('?')) FROM
STRING
'"Belgium", "12219.0"\n"France","21059.0"\n"Germany","39932.0"\n"Italy","6706.0"\n"Latvi
a","589.0"\n"Romania","917.0"\n"Slovenia","724.0"\n"Spain","4402.0"\n"United
Kingdom","36445.0"' string delimited by '"' delimited by ',' ADD
WITH
VIEW_SINGLEAXIS_66_7 AS (SELECT "id_2" AS "id_2","id_3" AS
"id_3",ROW_NUMBER( ) OVER (ORDER BY "id_2" ASC) AS "id_8" FROM (SELECT
"id_2","id_3" FROM "DATAQUERY_66_1"))
SELECT "id_2", "id_3" FROM VIEW_SINGLEAXIS_66_7 ORDER BY "id_8" ASC
LIMIT 100001
```

As described herein, filters or predicates may be added to queries, such as in a chart request or as a global or local analytical action. For example, the query above may be limited to just France (the city of Bretigny), as shown in this query:

```
SELECT DISTINCT
T10."C4" AS C4,
SUM(T10."C26") AS M1
FROM "NODE_146_71acfb8b_e18f_4bbc_8e6b_fdc6fd73dc15" T10
WHERE
((T10."F111" IS NOT NULL) AND (T10."F111" = V'Include'))
AND ((T10."C13" IN (V'V-B Salesorg.', V'V-CH Salesorg.', V'V-CZ Salesorg.', V'V-D
SalesOrg.', V'V-E Salesorg.', V'V-EST Salesorg.', V'V-F Salesorg.', V'V-GB Salesorg.', V'V-I
Salesorg.', V'V-LT Salesorg.', V'V-LV Salesorg.', V'V-NL Sales Org.', V'V-RO Salesorg.',
V'V-SLO Salesorg.')) AND (T10."C13" IS NOT NULL))
AND ((T10."C16" IN (V'Free of Charge Order', V'Standard Order')) AND (T10."C16" IS
NOT NULL))
AND ((T10."C1" IN (V'Baltic DC Riga', V'"Boskovice', V' Czech Republic (DC)"', V'DC
Italy - Verona', V'DC Valladolid', V'DSV Slovenia d.o.o.', V'GROSSLEHNA DC DE',
V'GÄRTRINGEN DC DE', V'HAMBURG DC DE', V'Kuehne & Nagel (AG & Co.) KG',
V'MAINZ DC DE', V'KÜHNE & NAGEL (AG & CO.) KG', V'VELUX C/O DSV Belgium
(DC)', V'VELUX C/O DSV GB (DC)', V'VELUX C/O RHENUS LOGISTICS- FR',
V'VELUX ROMANIA S.R.L.')) AND (T10."C1" IS NOT NULL))
AND ((T10."F131" IS NOT NULL) AND (T10."F131" = V'Brétigny'))
GROUP BY
C4
ORDER BY
1 ASC limit 100000 offset 0
```

Once the data for the main chart is obtained at 234, the main chart may be rendered at 238. Generally, the main chart may be rendered at 238 similarly to rendering the exploration charts at 208 in FIG. 2A. Rendering the main chart at 238 may include instantiating a data structure or object for the data obtained at 234 and populating it with the data obtained. In some embodiments, this data structure or object may be passed to another system or a user interface. In other embodiments, rendering the main chart at 238 may include rendering the graphical chart of the main chart data; this may further include displaying the rendered main chart, such as in a user interface. An indicator, flag, or other variable or identifier may be set at 238 to indicate the rendered chart is the main chart.

Primary chart data may be obtained for primary charts 1 to n at 236a-n, in parallel to obtaining the main chart data at 234 and rendering the main chart at 238. Generally, primary chart data may be obtained at 236*a-n* similarly to obtaining the main chart data at 234. An example primary chart query is:

```
SELECT DISTINCT
T10."C118" ASC118,
SUM(T10."C26") AS M1
FROM "NODE_146_71acfb8b_e18f_4bbc_8e6b_fdc6fd73dc15" T10
WHERE
((T10."F111" IS NOT NULL) AND (T10."F111" = V'Include'))
AND ((T10."C13" IN (V'V-B Salesorg.', V'V-CH Salesorg.', V'V-CZ Salesorg.', V'V-D
SalesOrg.', V'V-E Salesorg.', V'V-EST Salesorg.', V'V-F Salesorg.', V'V-GB Salesorg.', V'V-I
Salesorg.', V'V-LT Salesorg.', V'V-LV Salesorg.', V'V-NL Sales Org.', V'V-RO Salesorg.',
V'V-SLO Salesorg.')) AND (T10."C13" IS NOT NULL))
AND ((T10."C16" IN (V'Free of Charge Order', V'Standard Order')) AND (T10."C16" IS
NOT NULL))
AND ((T10."C1" IN (V'Baltic DC Riga', V'"Boskovice', V Czech Republic (DC)"', V'DC
Italy - Verona', V'DC Valladolid', V'DSV Slovenia d.o.o.', V'GROSSLEHNA DC DE',
V'GÄRTRINGEN DC DE', V'HAMBURG DC DE', V'Kuehne & Nagel (AG & Co.) KG',
V'MAINZ DC DE', V'KÜHNE & NAGEL (AG & CO.) KG', V'VELUX C/O DSV Belgium
(DC)', V'VELUX C/O DSV GB (DC)', V'VELUX C/O RHENUS LOGISTICS- FR',
V'VELUX ROMANIA S.R.L.')) AND (T10."C1" IS NOT NULL))
GROUP BY
C118
ORDER BY
1 ASC limit 100000 offset 2
create table "DATAQUERY_72_1" ("id_2" varchar(*) NULL, "id_3" double NULL)
LOAD TABLE "DATAQUERY_72_1"("id_2" NULL('?'), "id_3" NULL('?')) FROM
STRING
'"Belgium","12219.0"\n"France","21059.0"\n"Germany","39932.0"\n"Italy","6706.0"\n"Latvi
a","589.0"\n"Romania","917.0"\n"Slovenia","724.0"\n"Spain","4402.0"\n"United
Kingdom","36445.0"' string delimited by '"' delimited by ',' ADD
WITH
VIEW_SINGLEAXIS_72_7 AS (SELECT "id_2" AS "id_2","id_3" AS
"id_3",ROW_NUMBER() OVER (ORDER BY "id_2" ASC) AS "id_8" FROM (SELECT
"id_2","id_3" FROM "DATAQUERY_72_1"))
SELECT "id_2", "id_3" FROM VIEW_SINGLEAXIS_72_7 ORDER BY "id_8" ASC
LIMIT 100001
```

Once the data for a primary chart is obtained at 236*a-n*, that primary chart may be rendered at 240*a-n*. As each primary chart may be processed in parallel 233, once data for a given primary chart is obtained, that primary chart may be rendered without necessarily waiting for other primary charts' data to be obtained. Generally, the primary charts may be rendered at 240*a-n* similarly to rendering the main chart at 238 or the exploration charts at 208 in FIG. 2A. Rendering the primary charts at 240*a-n* may include instantiating a data structure or object for the data sets obtained at 236*a-n* and populating each with the relevant data set obtained. In some embodiments, this data structure or object may be passed to another system or a user interface. In other embodiments, rendering the primary charts at 240*a-n* may include rendering separate graphical charts of the primary chart data sets; this may further include displaying the rendered primary charts, such as in a user interface. An indicator, flag, or other variable or identifier may be set at 240*a-n* to indicate the rendered charts are primary charts.

The parallel process initiated at 233 may be closed at 241 when the main chart and primary charts have been rendered at 238, 240*a-n*.

Helper charts may be selected for rendering at 242. Selecting helper charts at 242 may include initiating rendering all helper charts needed, such as were identified when entering exploration mode at 232. Alternatively, selecting helper charts at 242 may include initiating rendering of a subset of the helper charts needed, such an initial set of one or more charts, including as selected by a user, or a set number or maximum number, of the charts that were identified when entering exploration mode at 232. For example, selecting helper charts at 242 may include selecting a set number, such as a three, of charts, or selecting up to a set number, such as a fixed number (e.g. three) of charts, or a percentage of the total helper charts needed (e.g., displaying a third or half of the total charts). Selecting the helper charts for rendering at 242 may be accomplished through a user interface, such as through a user prompt or widget, or may be accomplished by sending a request to a program service for rendering charts, such as through an API, with helper chart arguments (e.g. the number of charts to render, the type, etc.). Selecting the helper charts for rendering at 242 may be accomplished automatically by the process 230, and may be based on the chart request (e.g. the chart type and data definition), or other chart information such as that obtained when entering exploration mode at 232.

The process 230 may be parallelized at 243, which may be accomplished similarly to parallelization at 233. Generally, the process 230 may be parallelized by obtaining processing threads from a thread pool or generating new process threads. For example, each chart to be rendered may be processed separately in its own thread or threads.

Helper chart data may be obtained for helper charts 1 to m at 244*a-m*. Generally, helper chart data may be obtained at 244*a-m* similarly to obtaining the main chart data at 234 or the primary chart data sets at 236*a-n*. Obtaining helper chart data sets at 244*a-m* may include accessing one or more data sources to obtain the data points for the helper charts, such as show in FIG. 1C. The one or more data sources may be local or remote data sources. Generally, accessing a data source may include executing a query against the data source, which then returns the requested data. However, in some cases, the data can be accessed in another manner, such as when data is included in a chart request or when data has already been retrieved and cached. In a particular example, an initial query can return an entire data set, but the entire data set is not initially rendered. As charts are needed, the appropriate data can be selected from the stored, initially retrieved pool of data.

Once the data for a helper chart is obtained at 244*a-m*, that helper chart may be rendered at 246*a-m*. As each helper chart may be processed in parallel 243, once data for a given helper chart is obtained, that helper chart may be rendered without necessarily waiting for other helper charts' data to be obtained. Generally, the helper charts may be rendered at 246*a-m* similarly to rendering the main chart at 238, the primary charts at 240*a-n*, or the exploration charts at 208 in FIG. 2A. Rendering the helper charts at 246*a-m* may include instantiating a data structure or object for the data sets obtained at 244*a-m* and populating each with the relevant data set obtained. In some embodiments, this data structure or object may be passed to another system or a user interface. In other embodiments, rendering the helper charts at 246*a-m* may include rendering separate graphical charts of the helper chart data sets; this may further include displaying the rendered helper charts, such as in a user interface. An indicator, flag, or other variable or identifier may be set at 246*a-n* to indicate the rendered charts are helper charts.

The parallel process initiated at 243 may be closed at 247 when the helper charts have been rendered at 246*a-m*. In embodiments where not all helper charts are selected at 242, the process may repeated after closing the parallelization at 247, returning to selecting further helper charts at 242. For example, further helper charts may be selected at 242 for rendering, with the process 230 continuing for the newly selected helper charts.

In other embodiments, some or all helper charts, as described herein, may be selected upon entering exploration mode at 232. In such embodiments, obtaining helper chart data at 244*a-m* and rendering the helper charts at 246*a-m* may be accomplished in parallel 233 with obtain main chart and primary chart data at 234, 236*a-n*, and rendering the main chart and primary charts at 238, 240*a-n*. In other embodiments, selecting helper charts 242 may be accomplished in parallel to rendering the main charts or primary charts 233-241.

Example 7—Exploration Mode Chart Rendering Process Sequence

Figure 3A:
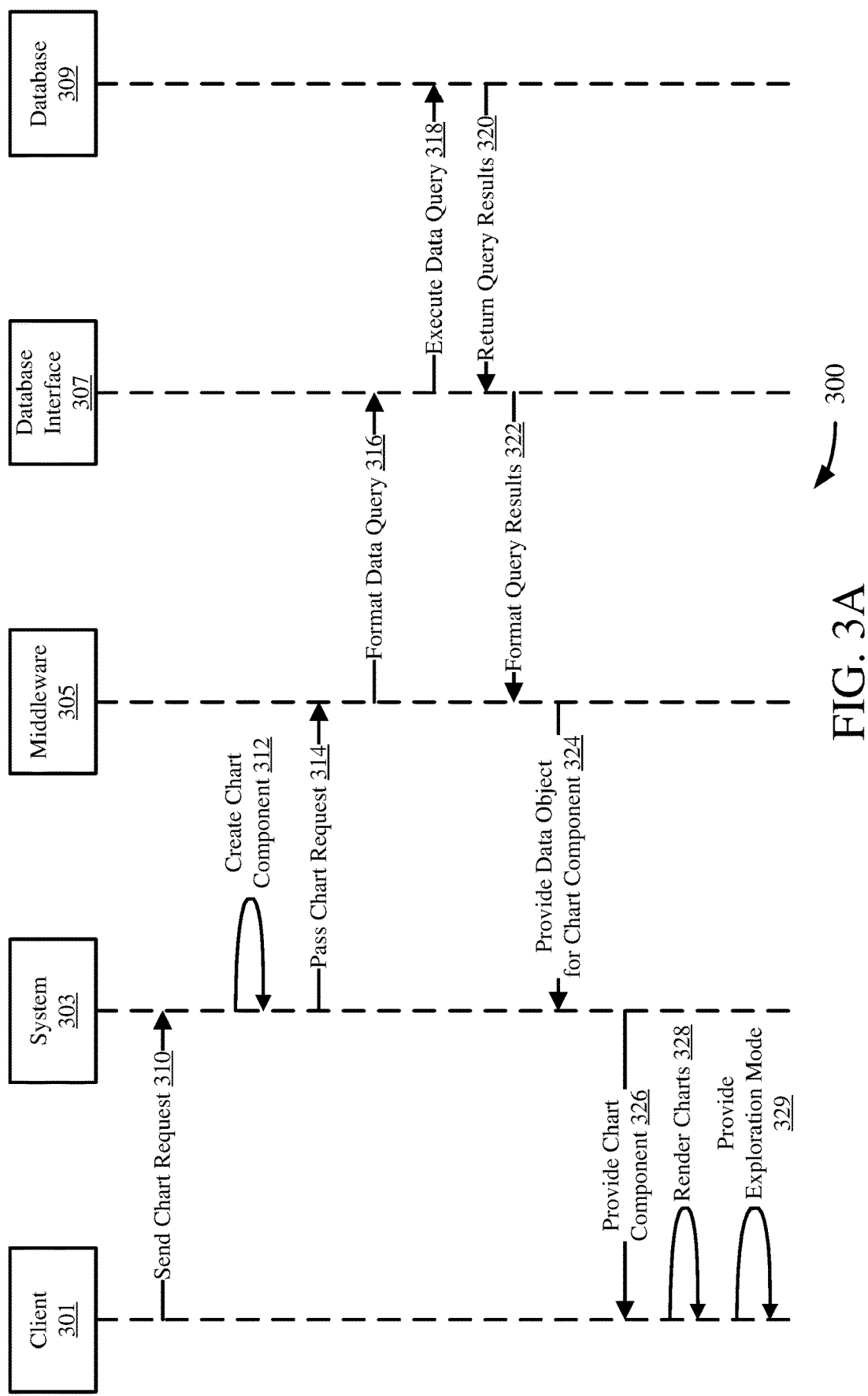
FIG. 3A is a sequence diagram illustrating a process for rendering exploration mode charts across applications or systems.

FIG. 3A is a sequence diagram illustrating a process 300 for rendering exploration mode charts across applications or systems. The process 300 for rendering exploration mode charts may be similar to, or integrated with in whole or in part, process 200 shown in FIG. 2A or process 230 shown in FIG. 2B.

The process 300 may begin at a client 301. A client 301 may be an application or program integrated with or coupled to a user interface which may enable requesting analytical charts, which may include selecting data for display (e.g. data query parameters). In other embodiments, the client 301 may include an API for receiving chart requests. For example, the client 301 may be Lumira® Client by SAP SE, of Walldorf, Germany.

The client 301 may send a chart request 310 to a system 303. The chart request 310 may include a type of chart request and parameters defining a data set to be rendered in the chart. The chart request 310 may include other parameters as well, such as references to one or more data sources to access for the requested data, requested groupings or partitions of the requested data, one or more analytical actions, chart data dimensions, or parameters such as a screen type, size, resolution, other settings, or combinations thereof.

A system 303 may be an application or program which may process chart rendering in whole or in part. For example, the system 303 may be Lumira® Backend by SAP SE, of Walldorf, Germany. The client 301 and the system 303 may reside on the same server, or on separate servers on the same network, or on separate networks. In some embodiments, the client 301 and the system 303 may be integrated together; in other embodiments they may be separate applications; in other embodiments they may be loosely coupled applications, such as implemented through a set of interrelated microservices.

The system 303 may create a chart component 312. A chart component created at 312 may be a data structure or object for a chart such as a base chart or an exploration mode chart, as described herein; creating the chart component 312 may include instantiating such a data structure or object. A chart component 312 created by the system 303 may be associated with or linked to other chart components similarly created to render a large data set.

The system 303 may pass a chart request 314 to middleware 305. The passed chart request 314 may be the received chart request 310, or may be a modified version of the received chart request, such as being formatted to match the middleware 305 interface. The passed chart request 314 may also include a reference or other identifier to the created chart component 312.

A middleware 305 may be an application or program which may process chart rendering in whole or in part. For example, the middleware 305 may be Lumira® BICS by SAP SE, of Walldorf, Germany. The middleware 305 may be connected to or integrated with the client 301 or the system 303, as similarly described for the client and system.

The middleware 305 may format a data query 316, which is sent to a database interface 307. Formatting a data query 316 may include generating a query, such as an SQL query, based on the received chart request 314 or reformatting a query received in the received chart request (such as to be compatible with the database interface 307). For example, a query may be passed 316 stored in a JSON object, and formatting the query may include appending a page or pagesize into the query.

A database interface 307 may be an application or program which may process or route a database query. For example, the database interface 307 may be Lumira® BIQuery by SAP SE, of Walldorf, Germany. The database interface 307 may be connected to or integrated with the client 301, the system 303, or the middleware 305, as similarly described for the client and system. Generally, the database interface 307 may be integrated with the database 309.

The database interface 307 may execute a data query 318 against the database 309, or may pass the data query to the database for execution. Executing the data query 318 may include executing the data query with a limit and offset, to ensure a correct partition or subset of data is received for the chart (e.g. exploration mode chart). The database 309 then returns query results 320 to the database interface 307.

The database interface 307 may receive the query results 320 and format the query results before passing 322 to the middleware 305. For example, the query results 320 may be stored in the JSON object the query was received in 316. Alternatively, the query results 320 may be reformatted into a new JSON object, or other data structure. In some embodiments, the query results 320 may be encapsulated or formatted for transfer to the middleware 305 without changing the query results structure, as returned from the database 309.

The middleware 305 receives the formatted query results 322 and provides a chart component data object 324 to the system 303. Providing the data object 324 may include passing the JSON object for the chart component in the system 303. Providing the data object 324 may additionally or alternatively include instantiating a new data object, such as a data object compatible with the created chart component 312, which may contain the formatted query results 322, or be linked to or associated with the formatted query results.

The system 303 may receive the chart component data object 324, and provide the chart component 326 to the client 301. The chart component 326 may include the data object 324; in some embodiments, the chart component 326 may be the data object 324. Providing the chart component 326 may include integrating the chart component with the data object or the query results (if separate). For example, integrating the chart component and query results may include storing the query results, such as the JSON data object with the query results, in the chart component 312, 326, or linking the chart component with the JSON query results, such as by setting a pointer or other reference to the query results.

The client receives the chart component at 326 and may proceed to render a chart 328 (or charts, if other charts are ready for rendering as well), as described herein. The client 301 may provide exploration mode 329 for the rendered charts, as described herein.

Example 8—Exploration Mode Chart Rendering Parallel Process Sequence

Figure 3B:
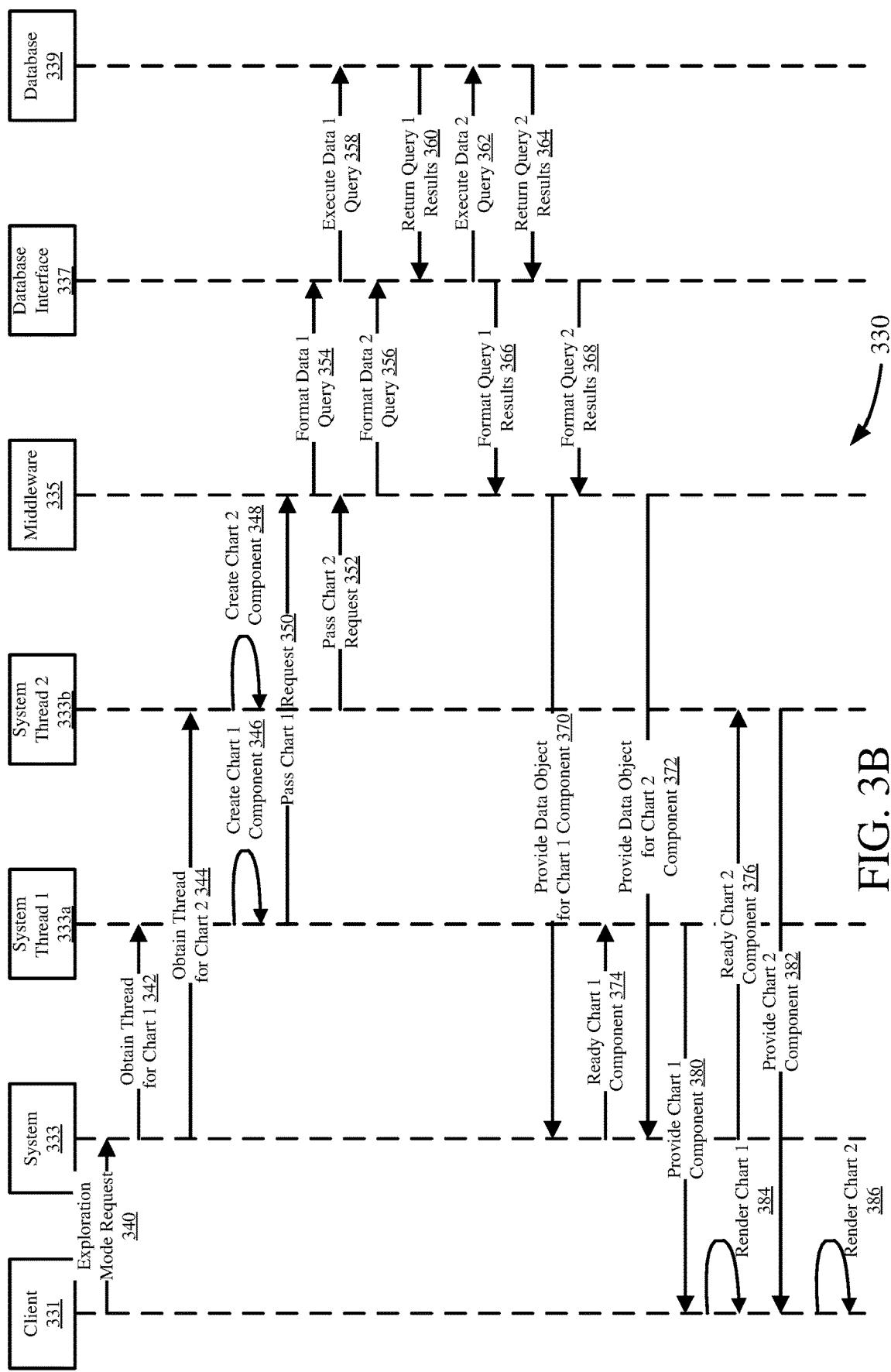
FIG. 3B is a sequence diagram illustrating a process for rendering exploration mode charts across applications or systems in parallel.

FIG. 3B is a sequence diagram illustrating a process 330 for rendering exploration mode charts across applications or systems in parallel (e.g. multithreaded). The process 330 is generally analogous to the process 300 shown in FIG. 3A, while demonstrating a parallel version through multithreading. The process 330 for rendering exploration mode charts may be similar to, or integrated with in whole or in part, process 200 shown in FIG. 2A or process 230 shown in FIG. 2B.

The process 330 may begin at a client 331. The client 331 may send a chart exploration mode request 340 to a system 333. The chart exploration mode request 340 may include a type of chart request and parameters defining a data set to be rendered in the chart. The chart exploration mode request 340 may include other parameters as well, such as references to one or more data sources to access for the requested data, requested groupings or partitions of the requested data, one or more analytical actions, or chart data dimensions. The chart exploration mode request 340 may include a number of exploration mode charts needed, and may further include classifications for the charts.

The system 333 may obtain 342 a first chart thread 333*a* for a first chart, as request in the received exploration mode request 340. The system may also obtain 344 a second thread 333*b* for a second chart. Obtaining threads 342, 344 may include requesting and receiving a thread from a thread pool, or instantiating a new thread for each requested thread. The threads 333*a-b* may work in parallel, and may be distributed across separate computing systems or reside on the same computing systems. Additional threads may be obtained for processing additional charts as needed based on the exploration mode request 340.

The system thread 1 333*a* may create a chart 1 component 346. In parallel, the system thread 2 333*b* may create a chart 2 component 348. A chart component created at 346, 348 may be a data structure or object for a chart such as a base chart or an exploration mode chart, as described herein; creating the chart component 346, 348 may include instantiating such a data structure or object. A chart component created 346, 348 by the system 333 in its threads 333*a*, 333*b* may be associated with or linked to other chart components similarly created to render a large data set. For example, chart 2 component 348 may include a reference to chart 1 component 346.

The system thread 1 333*a* may pass a chart 1 request 350 to middleware 335. In parallel, the system thread 2 333*b* may pass a chart 2 request 352 to middleware 335. The passed chart requests 350, 352 may be a portion of the received chart exploration mode request 340, or may be a modified version of the received chart exploration mode request, such as being formatted to match the middleware 335 interface. The passed chart requests 350, 352 may also include a reference or other identifier to their respective created chart components 346, 348.

The middleware 335 may format a data 1 query 354 for the chart 1 request 350, which is sent to a database interface 337. The middleware 335 may also format a data 2 query 356 for the chart 2 request 352, which is sent to a database interface 337; this may be done in parallel depending on the implementation of the middleware 335. Formatting a data query 354, 356 may include generating a query, such as an SQL query, based on the received chart exploration mode request 340 or reformatting a query received in the received chart requests 350, 352 (such as to be compatible with the database interface 337). For example, a query may be passed 354, 356 stored in a JSON object, and formatting the query may include appending a page or pagesize into the query.

The database interface 337 may execute the data 1 query 358 against a database 339, or may pass the data 1 query to the database for execution. Similarly, the database interface 337 may execute the data 2 query 362 against the database 339, or may pass the data 2 query to the database for execution. Executing the database query 358, 362 may include executing the query with a limit and offset, to ensure a correct partition or subset of data is received for the chart (e.g. exploration mode chart). The database 339 then returns the query results 360, 364 to the database interface 337.

The database interface 337 may receive the query results and format the respective query results before passing 366, 368 to the middleware 335. For example, the query results may be stored in the JSON object the query was received in 350, 352. Alternatively, the respective query results may be reformatted into a new JSON object, or other data structure. In some embodiments, the respective query results may be encapsulated or formatted for transfer to the middleware 335 without changing the query results structure as returned from the database 339.

The middleware 335 receives the respective formatted query results 366, 368 and provides respective data objects 370, 372 to the system 333. Providing the respective data objects 370, 372 may include passing the JSON objects for the chart components in the system 333. Providing the data objects 370, 372 may additionally or alternatively include instantiating new respective data objects, such as data objects compatible with the created chart components 346, 348, which may contain the respective formatted query results 366, 368, or be linked to or associated with the formatted query results.

The system 333 may ready the chart 1 component 374 by passing the received chart 1 data object 370 to thread 1 333*a*, for processing with the created chart 1 component 346. The system 333 may also ready the chart 2 component 376 by passing the received chart 2 data object 372 to thread 2 333b, for processing with the created chart 2 component 348.

The system thread 1 333a may receive the data object for the chart 1 component 374, and provide the chart 1 component 380 to the client 331. In parallel, the system thread 2 333b may receive the data object for the chart 2 component 376, and provide the chart 2 component 382 to the client 331. Providing the chart components 380, 382 may include integrating the chart component with the data object or the query results (if separate). For example, integrating the chart component and query results may include storing the query results, such as the JSON data object with the query results, in the chart component, or linking the chart component with the JSON query results, such as by setting a pointer or other reference to the query results.

The client receives the chart 1 and chart 2 components 380, 382 and may proceed to render the charts 384, 386 as described herein. The client 331 may provide exploration mode for the rendered charts, as described herein.

Generally, the actions taken to render chart 1 and chart 2 need not happen in a particular order with respect to the separate charts. For example, the database interface 337 may execute the data 2 query 362 before executing the data 1 query 358 against the database 339 if the data 2 query is ready for execution before the data 1 query. Other actions or steps may also be taken in parallel or in adjusted order between chart 1 and chart 2.

Example 9—Exploration Mode Analytical Charts User Interface

Figure 4A:
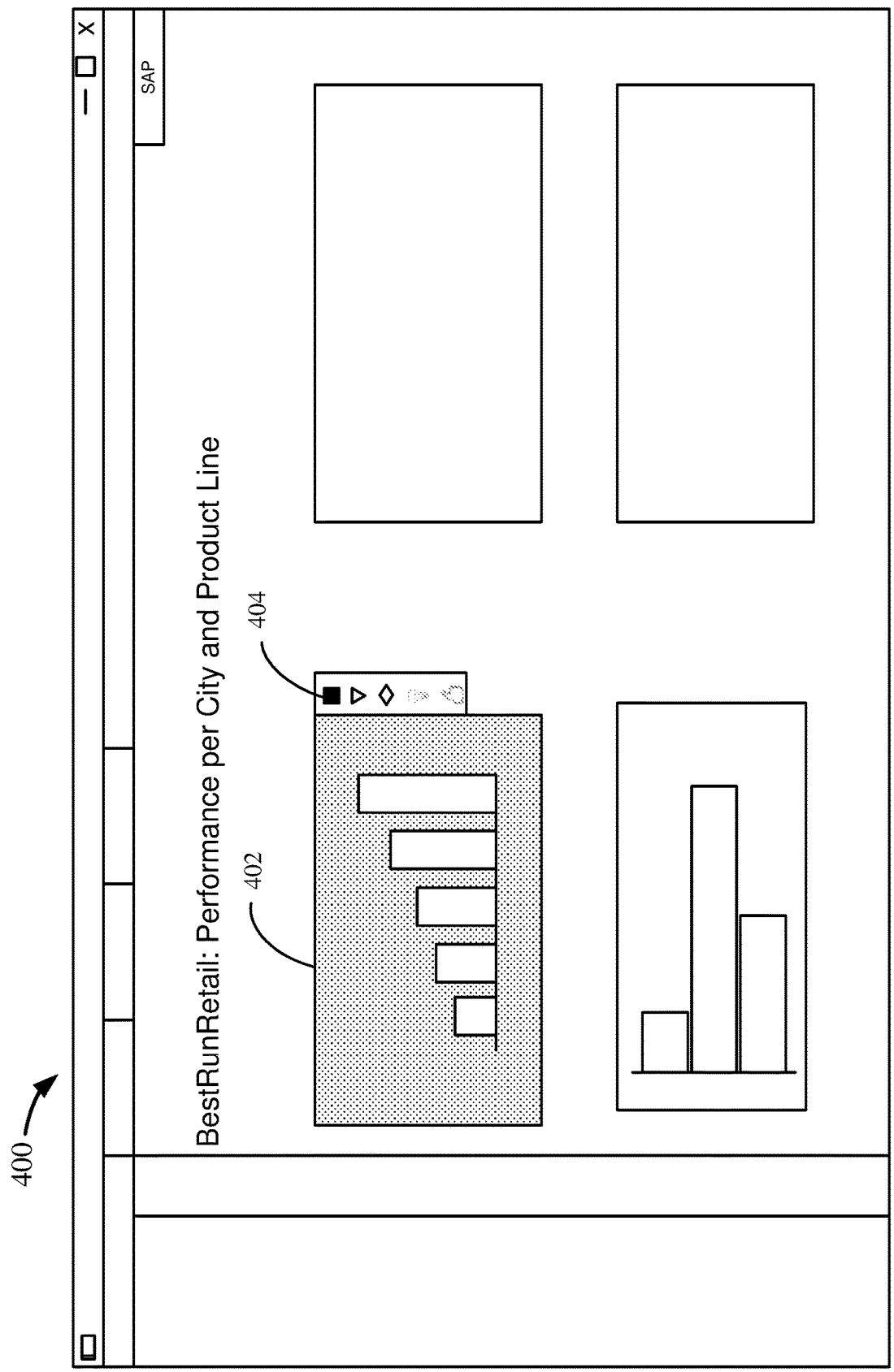
FIG. 4A is a diagram illustrating a user interface displaying a partial chart for a large-scale analytical chart.

FIG. 4A is a diagram illustrating a user interface 400 displaying a partial chart for a large-scale analytical chart. A user interface 400 may include a rendered chart 402 displaying at least a portion of data requested to be shown in an analytical chart. For example, the partial chart 402 may be a base chart as described herein. The partial chart 402 may be displayed clearly, or may be displayed with an indicator that the chart does not display all the data requested. For example, the partial chart 402 may be grayed out or have muted coloring, or may have a prompt or message displayed over it indicating it is a partial chart. Such a message may also indicate the number of data points displayed, or may indicate that exploration mode is available to view more data.

An exploration mode widget 404 or other indicator may be displayed. The exploration mode widget 404 may be displayed on, adjacent to, or other in relation to the partial chart 402 so that a user can select to enter an exploration mode. In other aspects, the widget 404 is placed at another location on the user interface 400. The exploration mode widget 404 may be used to active exploration mode, as described herein. In some examples, the exploration mode widget 404 is a button.

Figure 4B:
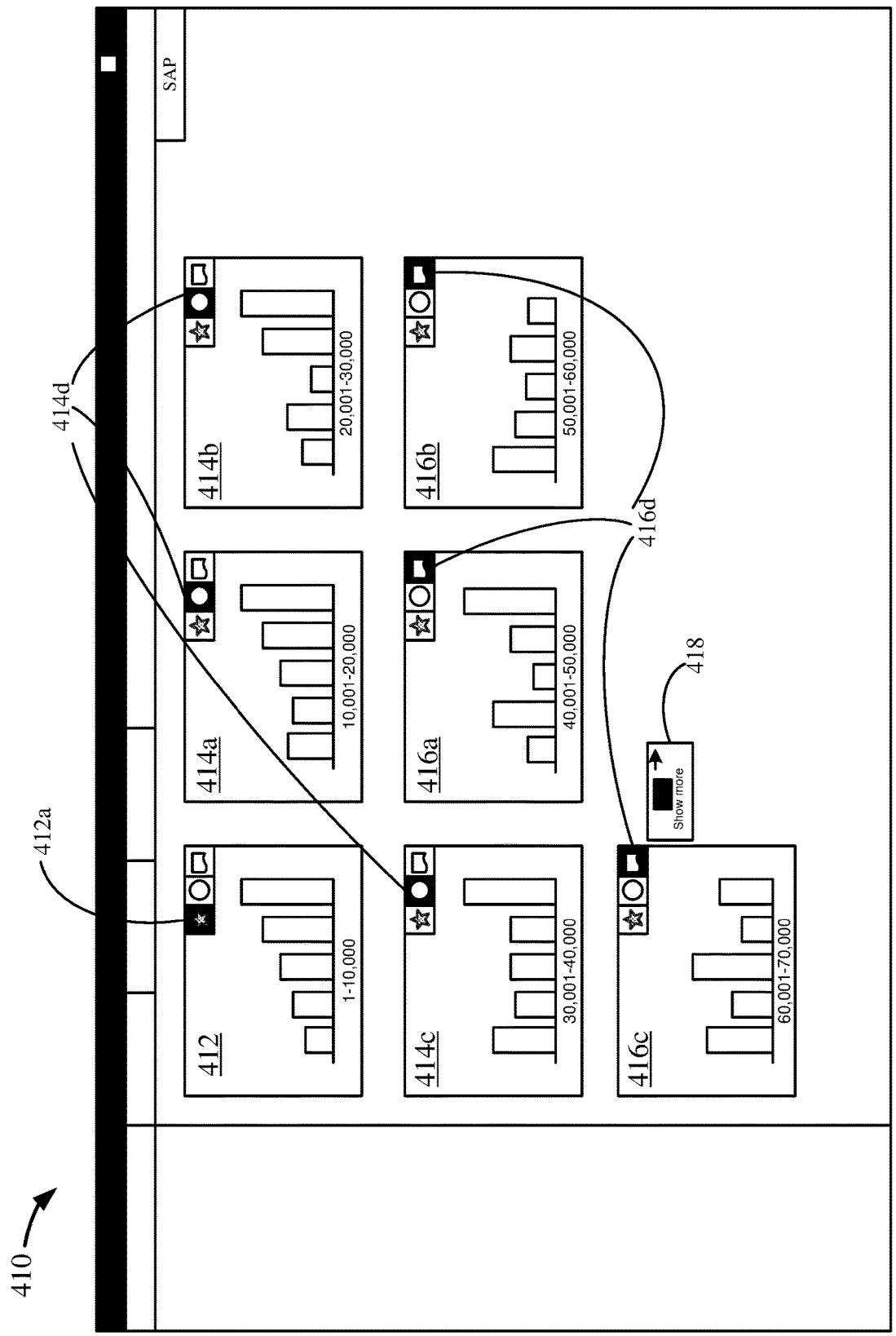
FIG. 4B is a diagram illustrating a user interface displaying exploration mode charts for a large-scale analytical chart.

FIG. 4B is a diagram illustrating a user interface 410 displaying exploration mode charts for a large-scale analytical chart. The user interface 410 may be displayed in response to a selection or other indication to display exploration mode. For example, the exploration mode widget 404 shown in FIG. 4A may be activated and the exploration mode user interface 410 may be rendered and displayed in response.

The user interface 410 may include one or more exploration mode charts 412, 414a-c, 416a-c, as described herein. The separate exploration mode charts 412, 414a-c, 416a-c may display separate partitions or subsets of the data request to be displayed in the chart, such as in user interface 400 shown in FIG. 4A. A main chart 412 may be displayed, and may have one or more widgets associated or related to it. A classification widget 412a may indicate the classification of the chart 412 as a main chart.

Similarly, one or more primary charts 414a-c may be displayed, and may have one or more associated or related widgets. Classification widgets 414d may indicate the classification of the charts 414a-c as a primary charts.

Similarly, one or more helper charts 416a-c main be displayed, and may have one or more associated or related widgets. Classification widgets 416d may indicate the classification of the charts 416a-c as helper charts.

The classification widgets 412a, 414d, 416d may be activated to change the classification of their respective charts, as described herein. Other widgets associated with their respective charts may be used to perform analytical actions or other charts functions as described herein; other widgets may be provided to perform global actions or functions.

A helper-charts widget 418 may be displayed for obtaining or displaying additional helper charts, as described herein. The helper chart widget 418 may, upon activation, initiate the process to render additional helper charts, as described herein, which may be displayed similarly to helper charts 416a-c. The helper chart widget 418 may be a button or other user prompt. The helper charts widget 418 may be hidden or not rendered if there are no further helper charts to display (e.g. when all data for the chart request is already displayed).

Example 10—Chart Exploration Module Environments

Figure 5A:
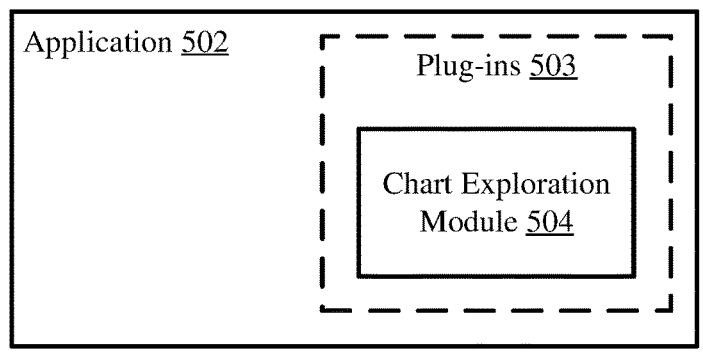
FIG. 5A is a schematic diagram depicting an application environment for a chart exploration module.

FIG. 5A is a schematic diagram depicting an application environment for a chart exploration module 504, which may provide analytical chart rendering functionality or exploration mode functionality as described herein. An application 502, such as a software application running in a computing environment, may have one or more plug-ins 503 (or add-ins or other software extensions to programs) that add functionality to, or otherwise enhance, the application. The chart exploration module 504 may be integrated with the application 502; for example, the chart exploration module may be integrated as a plug-in. The chart exploration module 504 may add functionality to the application 502 for rendering analytical charts for large data sets, which may be displayed in a user interface. For example, the application 502 may be a data analytics or enterprise resource planning (ERP) application, and the chart exploration module may be integrated with the analytics application to provide visualization of data sets.

Figure 5B:
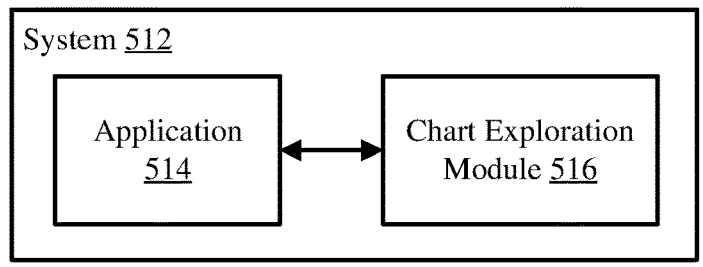
FIG. 5B is a schematic diagram depicting a system environment for a chart exploration module.

FIG. 5B is a schematic diagram depicting a system environment for a chart exploration module 516, which may provide analytical chart rendering functionality or exploration mode functionality as described herein. The chart exploration module 516 may be integrated with a computer system 512. The computer system 512 may include an operating system, or otherwise be a software platform, and the chart exploration module 516 may be an application or service running in the operating system or platform, or the chart exploration module may be integrated within the operating system or platform as a service or functionality provided through the operating system or platform. The system 512 may be a server or other networked computer or file system. Additionally or alternatively, the chart exploration module 516 may communicate with and provide analytical chart rendering functionality or exploration mode functionality, as described herein, to one or more applications 514, such as an analytics or ERP application, in the system 512.

Figure 5C:
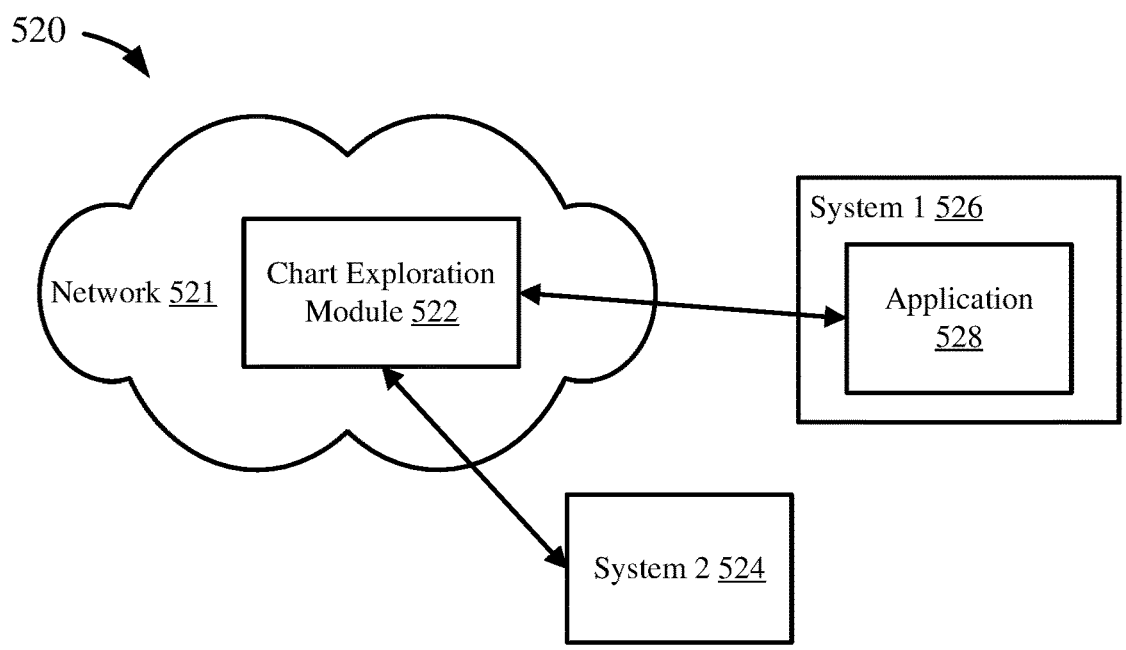
FIG. 5C is a schematic diagram depicting a network environment for a chart exploration module.
Figure 6B:
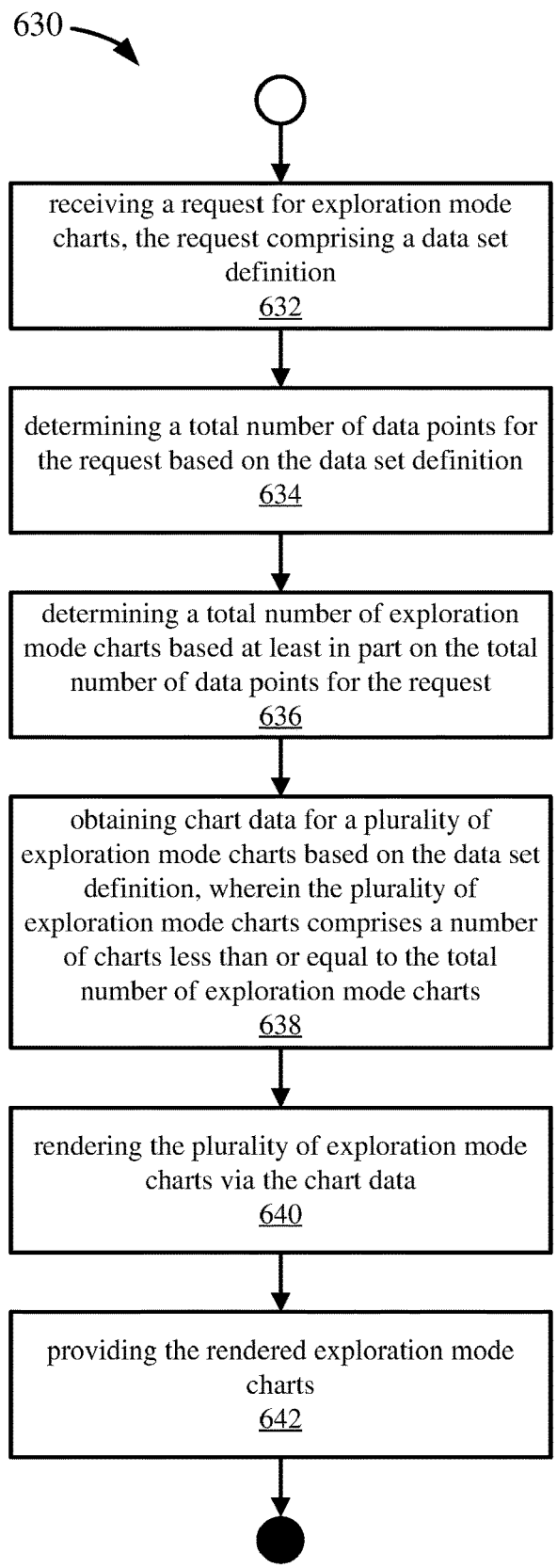
FIG. 6B is a flowchart illustrating a process for providing a plurality of exploration mode charts to supplement a base chart.
Figure 6C:
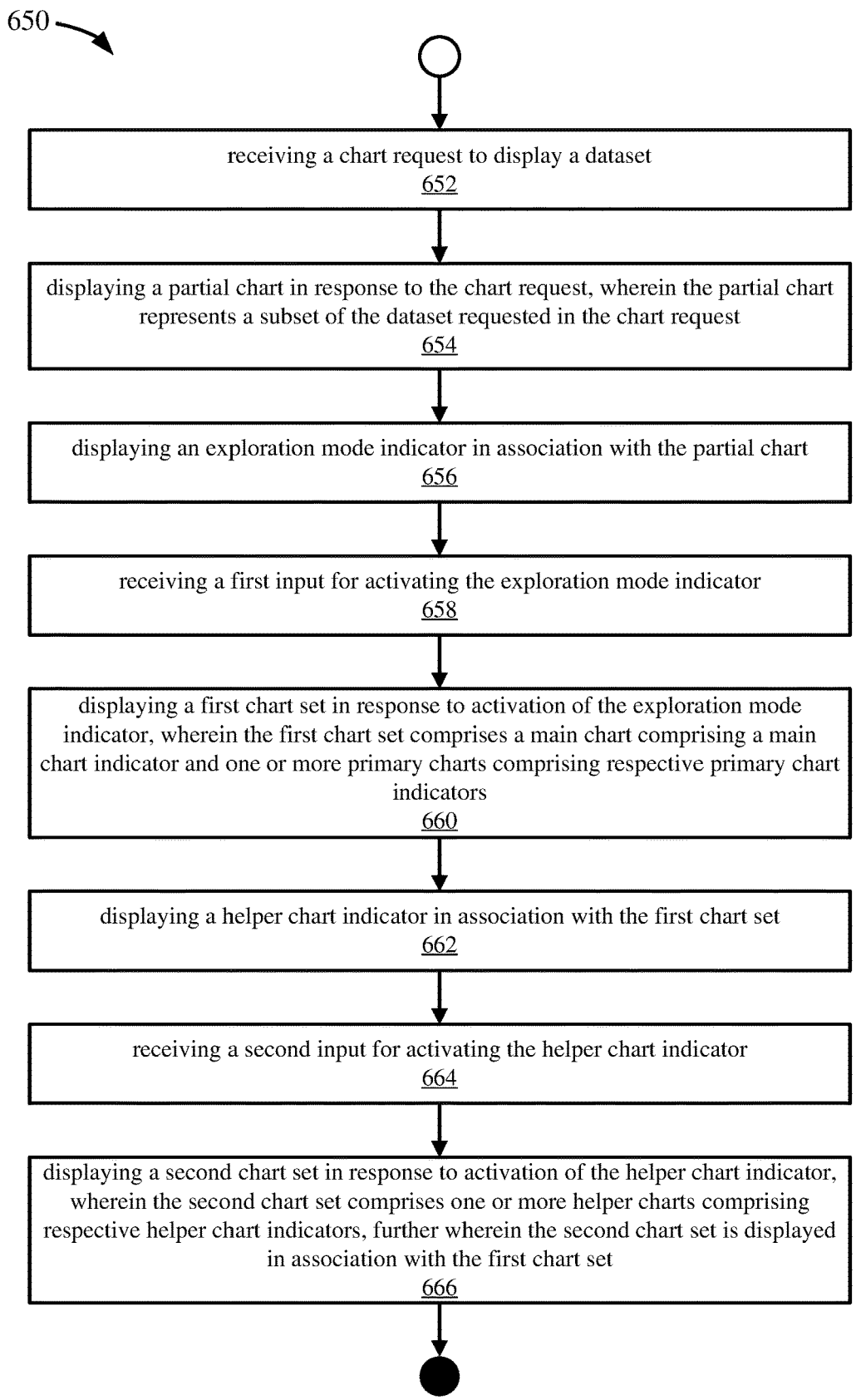
FIG. 6C is a flowchart illustrating a process for displaying analytical charts.

FIG. 5C is a schematic diagram depicting a network environment 520 for a chart exploration module 522, which may provide analytical chart rendering functionality or exploration mode functionality as described herein. The chart exploration module 522 may be available on a network 521, or integrated with a system (such as from FIG. 5B) on a network. Such a network 521 may be a cloud network or a local network. The chart exploration module 522 may be available as a service to other systems on the network 521 or that have access to the network (e.g., may be on-demand software or SaaS). For example, system 2 524 may be part of, or have access to, the network 521, and so can utilize chart rendering functionality from the chart exploration module 522. Additionally, system 1 526, which may be part of or have access to the network 521, may have one or more applications, such as application 528, that may utilize chart rendering functionality from the chart exploration module 522.

In these ways, the chart exploration module 504, 516, 522 may be integrated into an application, a system, or a network, to provide analytical chart rendering functionality or exploration mode functionality as described herein.

Example 11—Additional Analytical Chart Rendering Processes

A process 600 for generating a plurality of charts is provided herein. A chart request, including a chart type and a data set definition, may be received at 602. A data query based on the data set definition may be formatted at 604. The data query may return an initial data subset of the data set definition, and the initial data subset may be based on the chart type. The initial data subset may be obtained based on the data query at 606. An initial chart may be rendered based on the initial data subset at 608.

A request for additional charts based on the chart request may be received at 610. A total number of data points for the chart request may be determined based on the data set definition at 612. A total number of charts may be determined based at least in part on the chart type and the total number of data points for the request at 614. A plurality of additional data queries based on the data set definition may be formatted at 616. The plurality of additional data queries may include a number of data queries less than or equal to the total number of charts, based at least in part on the chart type. A plurality of additional data subsets may be obtained for a plurality of additional charts based on the plurality of additional data queries at 618. A plurality of additional charts may be rendered based on the plurality of additional data subsets at 620. A given additional chart of the plurality of additional charts may render a given additional data subset of the plurality of additional data subsets. The rendered plurality of additional charts may be provided at 622.

A process 630 for providing a plurality of exploration mode charts to supplement a base chart is provided herein. A request for exploration mode charts may be received at 632. The request may include a data set definition. A total number of data points for the request may be determined based on the data set definition at 634. A total number of exploration mode charts may be determined based at least in part on the total number of data points for the request at 636. Chart data may be obtained for a plurality of exploration mode charts based on the data set definition at 638. The plurality of exploration mode charts may include a number of charts less than or equal to the total number of exploration mode charts. The plurality of exploration mode charts may be rendered via the chart data at 640. The rendered exploration mode charts may be provided at 642.

A system for displaying analytical charts may perform user interface generation operations according to a process 650. A chart request to display a dataset may be received at 652. A partial chart may be displayed in response to the chart request at 654. The partial chart may represent a subset of the dataset requested in the chart request. An exploration mode indicator may be displayed in association with the partial chart at 656.

A first input for activating the exploration mode indicator may be received at 658. A first chart set may be displayed in response to activation of the exploration mode indicator at 660. The first chart set may include a main chart having a main chart indicator and one or more primary charts having respective primary chart indicators. A helper chart indicator may be displayed in association with the first chart set at 662.

A second input for activating the helper chart indicator may be received at 664. A second chart set may be displayed in response to activation of the helper chart indicator at 666. The second chart set may include one or more helper charts having respective helper chart indicators. Further, the second chart set may be displayed in association with the first chart set.

Example 12—Computing Systems

Figure 7:
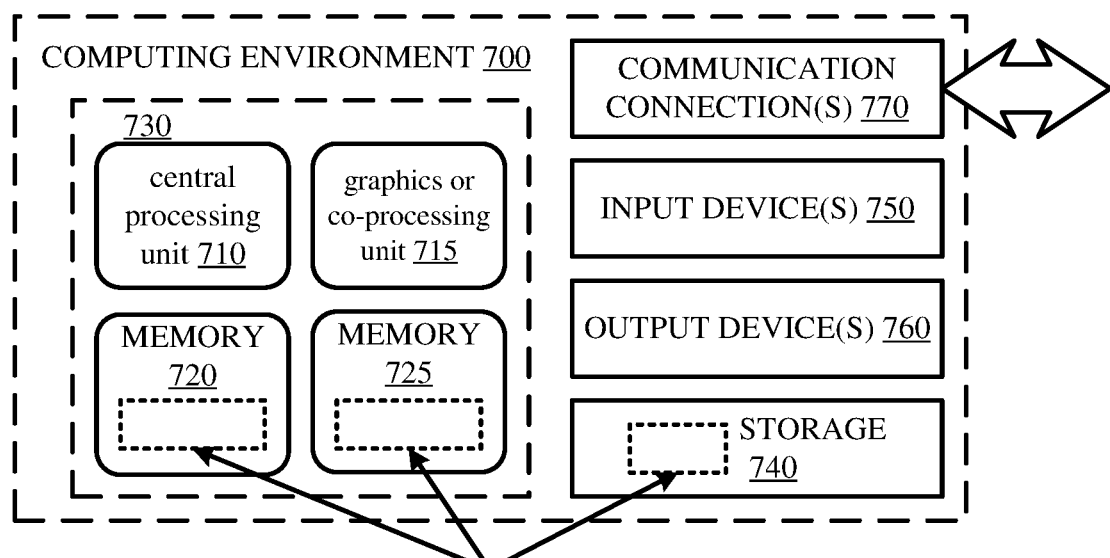
FIG. 7 is a diagram of an example computing system in which described embodiments can be implemented.

FIG. 7 depicts a generalized example of a suitable computing system 700 in which the described innovations may be implemented. The computing system 700 is not intended to suggest any limitation as to scope of use or functionality of the present disclosure, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions, such as for implementing components of the processes of FIGS. 2A-B, 3A-B, 4A, and 6A-C, the charts and data of FIGS. 1A-C and 4B-C, or the systems of FIGS. 5A-C. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s) 710, 715. The memory 720, 725 stores software 780 implementing one or more innovations described herein, in the form of computer-executable instructions suitable for execution by the processing unit(s) 710, 715. The memory 720, 725, may also store settings or settings characteristics, data sets, or charts shown in FIGS. 1A-C and 4B-C, systems in FIGS. 3A-B and 5A-C, or the steps of the processes shown in 2A-B, 3A-B, 4A, and 6A-C.

A computing system 700 may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 13—Cloud Computing Environment

Figure 8:
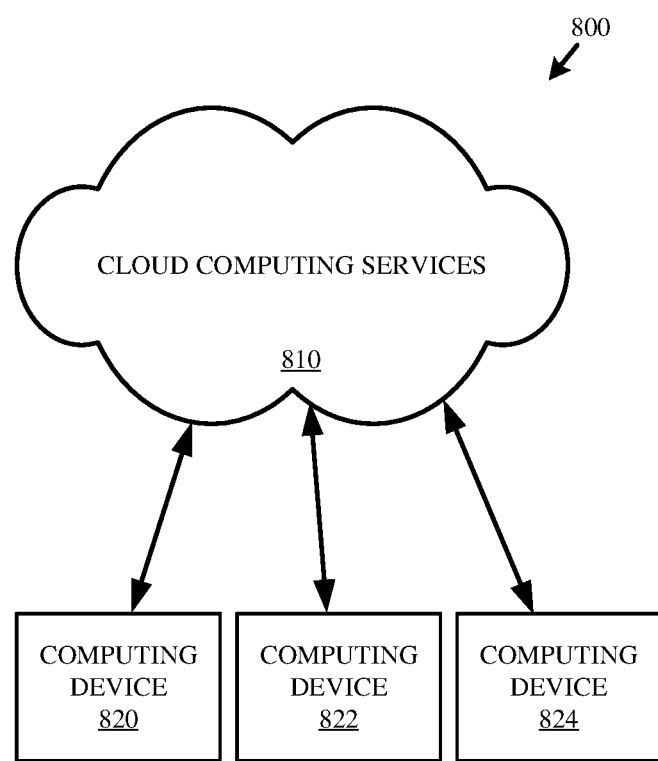
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operations (e.g., data processing, data storage, and the like).

Example 14—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. One or more non-transitory computer-readable storage media storing computer-executable instructions for causing a computing system to perform operations comprising:
   receiving a chart request comprising a chart type and a data set definition;
   formatting a data query based on the data set definition, wherein the data query returns an initial data subset of the data set definition and the initial data subset is based on the chart type;
   obtaining the initial data subset based on the data query;
   rendering an initial chart based on the initial data subset to provide a rendered initial chart;
   providing the rendered initial chart;
   after the providing the rendered initial chart, receiving a request from a user through a user interface for additional charts based on the chart request;
   determining a total number of data points for the chart request based on the data set definition;
   determining a total number of charts based at least in part on the chart type and the total number of data points for the request;
   formatting a plurality of additional data queries based on the data set definition, wherein the plurality of additional data queries comprises a number of data queries less than or equal to the total number of charts, based at least in part on the chart type;
   obtaining a plurality of additional data subsets for a plurality of additional charts based on the plurality of additional data queries;
   rendering a plurality of additional charts based on the plurality of additional data subsets, wherein a given additional chart of the plurality of additional charts renders a given additional data subset of the plurality of additional data subsets; and
   providing the rendered plurality of additional charts at least in part by concurrently displaying multiple additional charts of the plurality of additional charts.

2. The one or more non-transitory computer-readable storage media of claim 1, the operations further comprising:
   classifying the plurality of additional charts based on a chart hierarchy;
   wherein the additional charts are rendered by classification in order of their respective classifications in the chart hierarchy.

3. The one or more non-transitory computer-readable storage media of claim 1, the operations further comprising:
   classifying a given chart of the plurality of additional charts as a main chart;
   replacing the initial chart with the main chart;
   receiving user input to exit exploration mode; and
   removing the charts except for the main chart from a display.

4. The one or more non-transitory computer-readable storage media of claim 1, wherein the initial chart and charts of the plurality of additional charts are of the same chart style.

5. The one or more non-transitory computer-readable storage media of claim 1, wherein the plurality of additional charts are of at least two different chart types, the operations further comprising:
   receiving a global action input for performing a global chart action; and
   applying the global chart action to charts of the plurality of additional charts having a first chart type of the at least two different chart types but not to charts of the plurality of additional charts having a second chart type of the at least two different chart types.

6. The one or more non-transitory computer-readable storage media of claim 5, wherein the global action input comprises one or more of a refresh operation, a data filtering operation, a segmenting operation, or a change of chart style.

7. A method, implemented in a computing system comprising at least one hardware processor and at least one memory coupled to the at least one hardware processor, the method comprising:
   receiving a chart request comprising a chart type and a data set definition;

formatting a data query based on the data set definition, wherein the data query returns an initial data subset of the data set definition and the initial data subset is based on the chart type;

obtaining the initial data subset based on the data query;

rendering an initial chart based on the initial data subset to provide a rendered initial chart;

providing the rendered initial chart;

after the providing the rendered initial chart, receiving a request from a user through a user interface for additional charts based on the chart request;

determining a total number of data points for the chart request based on the data set definition;

determining a total number of charts based at least in part on the chart type and the total number of data points for the request;

formatting a plurality of additional data queries based on the data set definition, wherein the plurality of additional data queries comprises a number of data queries less than or equal to the total number of charts, based at least in part on the chart type;

obtaining a plurality of additional data subsets for a plurality of additional charts based on the plurality of additional data queries;

rendering a plurality of additional charts based on the plurality of additional data subsets, wherein a given additional chart of the plurality of additional charts renders a given additional data subset of the plurality of additional data subsets; and providing the rendered plurality of additional charts at least in part by concurrently displaying multiple additional charts of the plurality of additional charts.

8. The method of claim 7, further comprising:

classifying at least a portion of the plurality of charts into a first classification and a second classification.

9. The method of claim 8, wherein charts in the first classification are rendered before charts in the second classification.

10. The method of claim 7, wherein the plurality of charts are of at least two different chart types, the method further comprising:

receiving a global action input for performing a global chart action; and applying the global chart action to charts of the plurality of charts having a first chart type of the at least two different chart types but not to charts of the plurality of charts having a second chart type of the at least two different chart types.

11. The method of claim 10, wherein the global action input comprises one or more of a refresh operation, a data filtering operation, a segmenting operation, or a change of chart style.

12. A system comprising:

one or more memories;

one or more processing units coupled to the one or more memories; and one or more computer readable storage media storing instructions that, when loaded into the one or more memories, cause the one or more processing units to perform comprising:

receiving from a user a chart request to display a dataset;

displaying a partial chart in response to the chart request, wherein the partial chart represents a subset of the dataset requested in the chart request;

displaying an exploration mode indicator in association with the partial chart;

after the displaying the partial chart, receiving a first user input activating the exploration mode indicator;

displaying a first chart set in response to activation of the exploration mode indicator, wherein the first chart set comprises a main chart comprising a main chart indicator and one or more primary charts comprising respective primary chart indicators;

displaying a helper chart indicator in association with the first chart set;

receiving a second user input activating the helper chart indicator; and displaying a second chart set comprising a plurality of helper charts in response to the second user input the second chart set is displayed in association, and concurrently, with the first chart set and wherein given helper charts of the plurality of helper charts comprise data of the dataset not included in the first chart set.

13. The system of claim 12, the operations further comprising:

receiving a global action input for performing a global chart action; and applying the global chart action to the main chart and the one or more primary charts, but not applying the global chart action to the plurality of helper charts in response to the global action input.

14. The system of claim 13, wherein the global action input comprises one or more of a refresh operation, a data filtering operation, a segmenting operation, or a change of chart style.

15. The system of claim 13, the operations further comprising:

receiving a helper chart action for applying the global chart action to at least one of the one or more helper charts; and applying the global action to at least one of the one or more helper charts.

16. The system of claim 12, the operations further comprising:

receiving an exit action;

replacing the partial chart with the main chart in response to the exit action; and closing the main chart, the one or more primary charts, and the one or more helper charts.

17. The system of claim 16, the operations further comprising:

prior to receiving the exit action, receiving user input changing a primary chart to a main chart.

18. The system of claim 12, the operations further comprising:

displaying a chart classification widget for changing chart classification at least between a primary chart type and a main chart type, wherein the chart classification widget is displayed in association with one of the main chart, the one or more primary charts, or the one or more helper charts.

19. The system of claim 18, the user operations further comprising:

receiving a third input for activating the classification widget; and changing the classification of a chart in response to activation of the chart classification widget.

* * * * *